United States Patent [19]

Couture et al.

[11] Patent Number: 5,771,165
[45] Date of Patent: Jun. 23, 1998

[54] APPARATUS AND METHOD FOR CHARGING A DC BATTERY

[75] Inventors: Pierre Couture, Boucherville; Karim Slimani, Longueuil; Bruno Francoeur, Beloeil, all of Canada

[73] Assignee: Hydro-Quebec, Montreal, Canada

[21] Appl. No.: 904,583

[22] Filed: Aug. 6, 1997

Related U.S. Application Data

[62] Division of Ser. No. 659,159, Jun. 5, 1996.

[51] Int. Cl.⁶ .................................................. H02M 3/335
[52] U.S. Cl. ..................... 363/97; 323/338; 320/DIG. 28
[58] Field of Search ............................. 363/16, 17, 24, 363/39, 41, 97, 98, 131, 132, 136; 323/222, 225, 229, 332, 335, 338; 320/140, DIG. 28

[56] References Cited

U.S. PATENT DOCUMENTS

| | | | |
|---|---|---|---|
| 3,596,165 | 7/1971 | Andrews | 321/2 |
| 3,670,229 | 6/1972 | Harris | 320/59 |
| 3,938,018 | 2/1976 | Dahl | 320/2 |
| 4,031,449 | 6/1977 | Trombly | 320/2 |
| 4,200,830 | 4/1980 | Oughton et al. | 320/32 |
| 4,244,015 | 1/1981 | Beebe | 363/97 X |
| 4,301,398 | 11/1981 | Johnson | 320/21 |
| 4,384,321 | 5/1983 | Rippel | 363/124 |
| 4,472,672 | 9/1984 | Pacholok | 320/21 |
| 4,525,774 | 6/1985 | Kino et al. | 363/17 |
| 4,621,198 | 11/1986 | Roberge et al. | 307/82 |
| 4,656,412 | 4/1987 | McLyman | 320/39 |
| 4,692,681 | 9/1987 | Nilssen | 320/2 |
| 4,695,935 | 9/1987 | Oen et al. | 363/21 |
| 5,060,131 | 10/1991 | Sikora | 363/97 |
| 5,416,387 | 5/1995 | Cuk et al. | 363/16 |
| 5,510,974 | 4/1996 | Gu et al. | 363/134 |
| 5,598,326 | 1/1997 | Liu et al. | 363/47 |
| 5,675,485 | 10/1997 | Seong | 363/97 |

FOREIGN PATENT DOCUMENTS 945941  7/1982  Russian Federation .

*Primary Examiner*—Peter S. Wong
*Assistant Examiner*—Y. J. Han
*Attorney, Agent, or Firm*—Foley & Lardner

[57] ABSTRACT

The battery charger including a power factor correcting and voltage regulating apparatus having an inductor through which current is modulated by a modulator to obtain an efficient regulation and an efficient power factor correction. According to a first embodiment, the modulator comprises two rectifying elements connected to two controllable high frequency bidirectional switch elements. According to a second embodiment, the modulator comprises a rectifying element connected to a controllable high frequency switch. According to a third embodiment, an efficient battery charger is provided. It comprises an inverter including four controllable high frequency bidirectional switch elements connected in a bridge configuration. According to a fourth embodiment, a two-part battery charger is provided. It has an indicator for indicating quality of the coupling between the two parts thereof. According to a fifth embodiment, a two-part battery charger is provided. It has the necessary means for detecting the voltage delivered at the terminals of the battery and using it for controlling its operation.

44 Claims, 33 Drawing Sheets

```
┌─────────────────────────────────────────┐
│  A POWER FACTOR CORRECTING AND VOLTAGE  │
│  REGULATING METHOD                      │
└─────────────────────────────────────────┘
                    │
                    ▼
┌─────────────────────────────────────────┐
│     (a) RECEIVING BY MEANS OF AN        │
│  APPARATUS INPUT AN AC POWER SUPPLY     │
│  SIGNAL HAVING A FREQUENCY AND A PEAK   │
│  VALUE                                  │
└─────────────────────────────────────────┘
                    │
                    ▼
┌─────────────────────────────────────────┐
│     (b) LOW PASS FILTERING HIGH-FREQUENCY│
│  CURRENT COMPONENTS OUT OF THE AC POWER │
│  SUPPLY SIGNAL RECEIVED AT THE APPARATUS│
│  INPUT BY MEANS OF A FIRST LOW PASS     │
│  FILTER MEANS HAVING AN INPUT CONNECTED │
│  TO THE APPARATUS INPUT, AND AN OUTPUT  │
└─────────────────────────────────────────┘
                    │
                    ▼
┌─────────────────────────────────────────┐
│     (c) PROVIDING AN INDUCTOR CONNECTED │
│  TO THE OUTPUT OF THE LOW PASS FILTER   │
│  MEANS                                  │
└─────────────────────────────────────────┘
                    │
                    ▼
┌─────────────────────────────────────────┐
│     (d) MODULATING AN ALTERNATING       │
│  CURRENT FLOWING THROUGH THE INDUCTOR   │
│  AT A FREQUENCY HIGHER THAN THE ONE OF  │
│  THE AC POWER SUPPLY SIGNAL, AND        │
│  RECTIFYING THIS ALTERNATING CURRENT    │
│  TO DELIVER A REGULATED VOLTAGE SIGNAL  │
│  HAVING A VALUE EQUAL OR GREATER THAN   │
│  THE PEAK VALUE OF THE AC POWER SUPPLY  │
│  SIGNAL BY MEANS OF A RECTIFYING-       │
│  MODULATING BRIDGE CIRCUIT MEANS, THE   │
│  BRIDGE CIRCUIT MEANS INCLUDING TWO     │
│  RECTIFYING ELEMENTS CONNECTED          │
│  RESPECTIVELY TO TWO CONTROLLABLE HIGH  │
│  FREQUENCY BIDIRECTIONAL SWITCH         │
│  ELEMENTS TO FORM A PAIR OF BOOST       │
│  CONVERTERS, EACH OF THE SWITCH         │
│  ELEMENTS HAVING A GATE FOR RECEIVING   │
│  A SWITCH CONTROL SIGNAL                │
└─────────────────────────────────────────┘
                    │
                    ▼
                   (A)
```

FIG.9a

Iin

ILr

Ired

Io (B)

(e) CONTROLING THE FOUR SWITCH ELEMENTS BY MEANS OF THE FOLLOWING STEPS:
    (i) MULTIPLYING THE AVERAGE VOLTAGE SIGNAL BY THE AVERAGE CURRENT SIGNAL TO PRODUCE A BATTERY POWER SIGNAL INDICATIVE OF A POWER SUPPLIED TO THE BATTERY CONNECT TERMINALS;
    (ii) COMPARING THE BATTERY POWER SIGNAL TO A REFERENCE POWER SIGNAL TO PRODUCE A SIGNAL REPRESENTATIVE OF A DIFFERENCE BETWEEN THE BATTERY POWER SIGNAL AND THE REFERENCE POWER SIGNAL; AND
    (iii) PRODUCING THE SWITCH CONTROL SIGNALS AT THE CONTROLLED FREQUENCY AS A FUNTION OF THE SIGNAL PRODUCED BY THE COMPARING MEANS (f) APPLYING THE SQUARE VOLTAGE SIGNAL TO AN INPUT OF A RESONANT CIRCUIT TO PRODUCE AT ITS OUTPUT AN ALTERNATING CURRENT SIGNAL (g) APPLYING THE ALTERNATING CURRENT SIGNAL TO AN INPUT OF AN IMPEDANCE MATCHING TRANSFORMER TO DELIVER AT ITS OUTPUT A TRANSFORMED ALTERNATING CURRENT SIGNAL (h) RECTIFYING THE TRANFORMED ALTERNATING CURRENT SIGNAL TO PRODUCE A RECTIFIED CURRENT SIGNAL (j) LOW PASS FILTERING THE RECTIFIED CURRENT SIGNAL TO PRODUCE THE DIRECT CURRENT SIGNAL SUPPLIED TO THE BATTERY CONNECT TERMINALS

FIG.12b

```
┌─────────────────────────────────────────┐
│  METHOD OF OPERATING A SEPARABLE TWO   │
│  PART BATTERY CHARGER FOR SUPPLYING A  │
│  DIRECT CURRENT SIGNAL TO BATTERY      │
│  CONNECT TERMINALS                      │
└─────────────────────────────────────────┘
                    ▼
```

(a) PROVIDING A FIRST PART WHICH INCLUDES:

A SECONDARY WINDING OF AN IMPEDANCE MATCHING TRANSFORMER, HAVING AN OUTPUT FOR DELIVERING A TRANSFORMED ALTERNATING CURRENT SIGNAL;

A FIRST MAGNETIC CORE PART OF THE IMPEDANCE MATCHING TRANSFORMER, WHICH IS MAGNETICALLY COUPLED TO THE SECONDARY WINDING;

A CURRENT RECTIFIER FOR RECTIFYING THE TRANSFORMED ALTERNATING CURRENT SIGNAL AND DELIVERING A RECTIFIED CURRENT SIGNAL; AND

A LOW PASS FILTER MEANS FOR LOW PASS FILTERING THE RECTIFIED CURRENT SIGNAL TO SUPPLY A DIRECT CURRENT SIGNAL TO THE BATTERY CONNECT TERMINALS (b) PROVIDING A SECOND PART WHICH INCLUDES:

A VOLTAGE REGULATING MEANS FOR PRODUCING A REGULATED VOLTAGE SIGNAL FROM AN AC POWER SUPPLY SIGNAL;

AN INVERTER RESONANT CIRCUIT MEANS FOR INVERTING THE REGULATED VOLTAGE SIGNAL TO PRODUCE AN ALTERNATING CURRENT SIGNAL;

A PRIMARY WINDING OF THE IMPEDANCE MATCHING TRANSFORMER, HAVING AN INPUT FOR RECEIVING THE ALTERNATING CURRENT SIGNAL; AND

A SECOND MAGNETIC CORE PART OF THE IMPEDANCE MATCHING TRANSFORMER, WHICH IS MAGNETICALLY COUPLED TO THE FIRST PRIMARY WINDING, THE SECOND MAGNETIC CORE PART BEING MECHANICALLY CONNECTABLE TO THE FIRST MAGNETIC CORE PART (C)

FIG.14a

METHOD OF OPERATING A SEPARABLE TWO PART BATTERY CHARGER FOR SUPPLYING A DIRECT CURRENT SIGNAL TO BATTERY CONNECT TERMINALS:

(a) PROVIDING A FIRST PART WHICH INCLUDES:
    A SECONDARY WINDING OF AN IMPEDANCE MATCHING TRANSFORMER, HAVING AN OUTPUT FOR DELIVERING A TRANSFORMED ALTERNATING CURRENT SIGNAL;
    A FIRST MAGNETIC CORE PART OF THE IMPEDANCE MATCHING TRANSFORMER, WHICH IS MAGNETICALLY COUPLED TO THE SECONDARY WINDING;
    A CURRENT RECTIFIER FOR RECTIFYING THE TRANSFORMED ALTERNATING CURRENT SIGNAL AND DELIVERING A RECTIFIED CURRENT SIGNAL; AND
    A LOW PASS FILTER MEANS FOR LOW PASS FILTERING THE RECTIFIED CURRENT SIGNAL TO SUPPLY THE DIRECT CURRENT SIGNAL TO THE BATTERY TERMINALS (D)

FIG.15a

(b) PROVIDING A SECOND PART WHICH INCLUDES:

A VOLTAGE REGULATING MEANS FOR PRODUCING A DC OUTPUT VOLTAGE SIGNAL FROM AN AC POWER SUPPLY SIGNAL;

AN INVERTER RESONANT CIRCUIT MEANS FOR INVERTING THE DC OUTPUT VOLTAGE SIGNAL AND DELIVERING AN ALTERNATING CURRENT SIGNAL, THE INVERTER RESONANT CIRCUIT MEANS INCLUDING CONTROLLABLE HIGH FREQUENCY BIDIRECTIONAL SWITCH ELEMENTS, EACH OF THE ELEMENTS HAVING A GATE FOR RECEIVING A SWITCH CONTROL SIGNAL AT A CONTROLLED FREQUENCY DETERMINING THE DIRECT CURRENT SIGNAL SUPPLIED TO THE BATTERY CONNECT TERMINALS;

A PRIMARY WINDING OF THE IMPEDANCE MATCHING TRANSFORMER, HAVING AN INPUT FOR RECEIVING THE ALTERNATING CURRENT SIGNAL;

A SECOND MAGNETIC CORE PART OF THE IMPEDANCE MATCHING TRANSFORMER, WHICH IS MAGNETICALLY COUPLED TO THE FIRST PRIMARY WINDING, THE SECOND MAGNETIC CORE PART BEING MECHANICALLY CONNECTABLE TO THE FIRST MAGNETIC CORE PART;

A TERTIARY WINDING OF THE IMPEDANCE MATCHING TRANSFORMER, WHICH IS MAGNETICALLY COUPLED TO THE SECOND MAGNETIC CORE PART, THE TERTIARY WINDING BEING FOR DELIVERING A VOLTAGE SIGNAL INDICATIVE OF A VOLTAGE AT THE BATTERY CONNECT TERMINALS

(c) CONTROLLING THE SWITCH ELEMENTS AS A FUNCTION OF THE VOLTAGE SIGNAL DELIVERED BY THE TERTIARY WINDING

FIG.15b

```
┌─────────────────────────────────────────┐
│  A POWER FACTOR CORRECTING AND VOLTAGE  │
│  REGULATING METHOD                      │
└─────────────────────────────────────────┘
                    │
                    ▼
┌─────────────────────────────────────────┐
│ (a) RECEIVING BY MEANS OF AN APPARATUS  │
│ INPUT AN AC POWER SUPPLY SIGNAL HAVING A│
│ FREQUENCY AND A PEAK VALUE              │
└─────────────────────────────────────────┘
                    │
                    ▼
┌─────────────────────────────────────────┐
│ (b) LOW PASS FILTERING HIGH-FREQUENCY   │
│ CURRENT COMPONENTS OUT OF THE AC POWER  │
│ SUPPLY SIGNAL RECEIVED AT THE APPARATUS │
│ INPUT                                   │
└─────────────────────────────────────────┘
                    │
                    ▼
┌─────────────────────────────────────────┐
│ (c) RECTIFYING AN AC SIGNAL DELIVERED   │
│ FROM STEP (b) TO PRODUCE A RECTIFIED    │
│ VOLTAGE SIGNAL AT AN OUTPUT OF A        │
│ RECTIFYING MEANS                        │
└─────────────────────────────────────────┘
                    │
                    ▼
┌─────────────────────────────────────────┐
│ (d) PROVIDING AN INDUCTOR CONNECTED IN  │
│ SERIES TO THE OUTPUT OF THE RECTIFYING  │
│ MEANS                                   │
└─────────────────────────────────────────┘
                    │
                    ▼
                   (E)
```

FIG. 18a

(e) MODULATING A CURRENT FLOWING THROUGH THE INDUCTOR TO PRODUCE A MODULATED ALTERNATING CURRENT THROUGH THE INDUCTOR AT A FREQUENCY HIGHER THAN THE ONE OF THE AC POWER SUPPLY SIGNAL AND TO PRODUCE A REGULATED VOLTAGE SIGNAL HAVING A VALUE EQUAL OR GREATER THAN THE PEAK VALUE OF THE AC POWER SUPPLY SIGNAL BY MEANS OF A MODULATING MEANS INCLUDING A CONTROLLABLE HIGH FREQUENCY SWITCH MEANS CONNECTED TO A RECTIFYING ELEMENT TO FORM A BOOST CONVERTER, THE CONTROLLABLE HIGH FREQUENCY SWITCH MEANS HAVING A GATE FOR RECEIVING A SWITCH CONTROL SIGNAL (f) FILTERING ALTERNATING VOLTAGE COMPONENTS OUT OF THE REGULATED VOLTAGE SIGNAL, AND DELIVERING A DC OUTPUT VOLTAGE SIGNAL

FIG. 18b

(g) CONTROLLING THE CONTROLLABLE HIGH FREQUENCY SWITCH MEANS TO PRODUCE A DISCONTINUOUS CURRENT THROUGH THE INDUCTOR AT A FREQUENCY SUBSTANTIALLY HIGHER THAN THE FREQUENCY OF THE AC POWER SUPPLY SIGNAL TO REGULATE THE DC OUTPUT VOLTAGE SIGNAL AT A DESIRED VOLTAGE VALUE, THE STEP (g) FURTHER INCLUDING STEPS OF:

(i) DETECTING THE DC OUTPUT VOLTAGE SIGNAL DELIVERED FROM STEP (f) AND DELIVERING AN OUTPUT SIGNAL INDICATIVE OF THE DC OUTPUT VOLTAGE SIGNAL;

(ii) COMPARING THE OUTPUT SIGNAL DELIVERED IN STEP (i) A REFERENCE VOLTAGE SIGNAL TO PRODUCE A SIGNAL REPRESENTATIVE OF A DIFFERENCE BETWEEN THE DC OUTPUT VOLTAGE SIGNAL AND THE DESIRED VOLTAGE VALUE; AND (iii) PRODUCING THE AT LEAST ONE CONTROL SIGNAL BY MEANS OF A PULSE WIDTH MODULATOR AS A FUNCTION OF THE VALUE PRODUCED FROM STEP (ii)

FIG.18c

```
┌─────────────────────────────────────────┐
│  METHOD OF OPERATING A CONTROLLER       │
│ OF A POWER FACTOR CORRECTING AND VOLTAGE│
│       REGULATING APPARATUS              │
└─────────────────────────────────────────┘
```

(K) → ← (N)

INITIALIZING OF VARIABLES
Xn,Yn,Xn1,Yn1 AND PWM TO ZERO VALUES (Vref) → READING Vref (Vmes) → READING Vmes Vmes>V1 ? — NO
YES

SENDING AN OUTPUT SIGNAL
TO CLOSE AN INPUT RELAY

CALCULATING PWM AS A FUNCTION
OF A RAMP DEPENDING UPON Yn   (M)

Yn=Yn+1

SENDING AN OUTPUT SIGNAL
AS A FUNCTION OF PWM TO
CONTROL TWO CONTROLLABLE HIGH
FREQUENCY BIDIRECTIONAL SWITCH
ELEMENTS OF A RECTIFYING-
MODULATING BRIDGE CIRCUIT (Vmes) → READING Vmes (L)

FIG.20A 5,771,165

APPARATUS AND METHOD FOR CHARGING A DC BATTERY

This application is a division, of application Ser. No. 08/659,159, filed Jun. 5, 1996.

FIELD OF THE INVENTION

The present invention is concerned with an apparatus and a method for charging a DC battery.

BACKGROUND OF THE INVENTION

Known in the art, there is the U.S. Pat. No. 3,670,229 of Paul A. Harris, granted on Jun. 13, 1972 in which there is described a battery charging system having thyristors associated with a full wave rectifier for controlling the supply of power from an alternator to a battery. This device is a semi-controlled tri-phased rectifier circuit where the operating frequency of the switches is dependent on the network. One drawback with the present battery charging system is that the flow of the current in the thyristors is unidirectional, the output voltage is always below the maximum voltage of the network, and the operating frequency of the switches is equal to that of the network, which result in a power factor that is below 0.95 and is very dependent on the nature of the load. Furthermore, the power source can only be AC.

Also known in the art, there is the U.S. Pat. No. 4,384,321 of Wally E. Rippel, granted on May 17, 1983 in which there is described a single or multiphase chopper for operating a load from single or multiphase line energy with unity power factor. Therein, there is described the most common arrangement used in the industry. The control of unity power factor correction is effected by a rectified sinusoidal reference extracted from the network. This reference is multiplied by the control current provided by the voltage measurement of the battery. The output of the multiplier delivers the sinusoidal reference current which is compared to the measured current, thus producing a cyclic estimate from the calculated error signal. A drawback with this apparatus is that it necessitates two control feedback loops, it has to measure the line current, and the conduction of the switches is continuous. Because of that, this apparatus is relatively complex, and is not efficient.

Also known in the art, there is the U.S. Pat. No. 4,656,412 of W. T. McLyman, granted on Apr. 17, 1987 in which there is described a ferroresonant flux coupled voltage-regulating circuit having a pair of input terminals and a pair of output terminals for use in a battery charger. This charger may be formed in two parts with a separable core transformer providing flux coupling between the ferroresonant circuit and the input of the second rectifier. According to this patent, there is a physical separation between the primary and secondary windings. Many controllers for battery charger require that the voltage signal at the battery be available. In this configuration, there is a physical separation between the primary and the secondary windings but the control system of the apparatus is not separable.

Also known in the art, there are the following U.S. patents which describe different battery chargers: U.S. Pat. Nos. 3,596,165; 3,938,018; 4,031,449; 4,200,830; 4,301,398; 4,472,672; 4,525,774; 4,621,198; 4,692,681; 4,695,935; and Russian patent No. 945,941.

None of the above patents describes a two-part battery charger provided with the necessary means for monitoring the quality of the coupling between the two parts thereof.

None of the above patents describes a battery charger provided with the necessary means for providing to the controller thereof the voltage signal present at the battery terminals and at the same time electrically isolating the controller from the battery terminals.

It is an object according to a first aspect of the present invention to provide a battery charger with an improved power factor with respect to the prior art.

It is an object according to a second aspect of the present invention to provide a battery charger that is more efficient than the ones of the prior art.

It is an object according to third aspect of the present invention to provide a two-part battery charger that comprises the necessary means for monitoring the quality of the coupling between the two parts thereof.

It is an object according to a fourth aspect of the present invention to provide a two-part battery charger that comprises the necessary means for providing to the controller thereof the voltage signal present at the battery terminals in a simple manner.

SUMMARY OF THE INVENTION

According to the present invention, there is provided a power factor correcting and voltage regulating apparatus comprising:

an apparatus input for receiving an AC power supply signal having a frequency and a peak value;

a first low pass filter means having an input connected to the apparatus input for low pass filtering high-frequency current components out of the AC power supply signal received at the apparatus input, the low pass filter means having also an output;

an inductor connected to the output of the low pass filter means;

a rectifying-modulating bridge circuit means for modulating an alternating current flowing through the inductor at a frequency higher than the one of the AC power supply signal, rectifying this alternating current, and delivering a regulated voltage signal having a value equal or greater than the peak value of the AC power supply signal, the bridge circuit means including two rectifying elements connected respectively to two controllable high frequency bidirectional switch elements to form a pair of boost converters, each of the switch elements having a gate for receiving a switch control signal;

a second low pass filter means for low pass filtering alternating voltage components out of the regulated voltage signal, the second low pass filter means having an output for delivering a DC output voltage signal; and voltage detecting means for detecting the DC output voltage signal, the voltage detecting means having an output for delivering an output signal indicative of the DC output voltage signal; and a controlling means for controlling the switch elements to regulate the DC output voltage signal at a desired voltage signal by producing a discontinuous current through the inductor at a frequency substantially higher than the frequency of the AC power supply signal, the controlling means including:

a comparing means for comparing the output signal of the voltage detecting means to a reference voltage signal and delivering a signal representative of a difference between the DC output voltage signal and the desired voltage signal; and a pulse width modulator for producing the switch control signals as a function of the signal delivered by the comparing means.

According to the present invention, there is also provided a power factor correcting and voltage regulating method comprising steps of:

(a) receiving by means of an apparatus input an AC power supply signal having a frequency and a peak value;

(b) low pass filtering high-frequency current components out of the AC power supply signal received at the apparatus input by means of a first low pass filter means having an input connected to the apparatus input, and an output;

(c) providing an inductor connected to the output of the low pass filter means;

(d) modulating an alternating current flowing through the inductor at a frequency higher than the one of the AC power supply signal, and rectifying this alternating current to deliver a regulated voltage signal having a value equal or greater than the peak value of the AC power supply signal by means of a rectifying-modulating bridge circuit means, the bridge circuit means including two rectifying elements connected respectively to two controllable high frequency bidirectional switch elements to form a pair of boost converters, each of the switch elements having a gate for receiving a switch control signal;

(e) filtering alternating voltage components out of the regulated voltage signal, and delivering a DC output voltage signal; and (f) controlling the switch elements to produce a discontinuous current through the inductor at a frequency substantially higher than the frequency of the AC power supply signal to regulate the DC output voltage signal at a desired voltage signal, the step (f) further including steps of:

(i) detecting the DC output voltage signal delivered from step (e), and delivering an output signal indicative of the DC output voltage signal;

(ii) comparing the output signal delivered in step (i) to a reference voltage signal to produce a signal representative of a difference between the DC output voltage signal and the desired voltage signal; and (iii) producing the switch control signals by means of a pulse width modulator as a function of the signal produced from step (ii).

According to the present invention, there is also provided a battery charger for supplying a direct current signal to battery connect terminals, comprising:

a power supply means for producing a DC output voltage signal;

an inverter means for inverting the DC output voltage signal and delivering a square voltage signal, the inverter means including four controllable high frequency bidirectional switch elements connected in a bridge configuration having two opposite input ends for receiving the DC output voltage signal, and two other opposite output ends for supplying the square voltage signal, each of the four switch elements having a gate for receiving a switch control signal at a controlled frequency determining the direct current signal supplied to the battery connect terminals;

a voltage detecting means for detecting the DC output voltage signal and delivering a voltage signal indicative of the DC output voltage signal;

a current detector for detecting a current signal at the input ends of the bridge configuration and delivering a signal indicative of the current signal;

a controlling means for controlling the four switch elements, the controlling means including:

a current averaging means for averaging the signal delivered by the current detector and delivering an average current signal indicative of an average value of the current signal;

multiplying means for multiplying the voltage signal delivered by the voltage detecting means by the average current signal delivered by the current averaging means and delivering a battery power signal indicative of a power supplied to the battery connect terminals;

a regulating means for comparing the battery power signal to a reference power signal and delivering a signal representative of a difference between the battery power signal and the reference power signal; and an oscillator having an output for delivering the switch control signals at the controlled frequency as a function of the signal delivered by the regulating means;

a resonant circuit having an input for receiving the square voltage signal and an output for producing an alternating current signal;

an impedance matching transformer having a primary winding for receiving the alternating current signal, and a secondary winding for delivering a transformed alternating current signal;

a current rectifier for rectifying the transformed alternating current signal and delivering a rectified current signal; and a low pass filter means for low pass filtering the rectified current signal and delivering the direct current signal supplied to the battery connect terminals.

According to the present invention, there is also provided a method for supplying a direct current signal to battery connect terminals, comprising steps of:

(a) supplying a DC output voltage signal;

(b) inverting the DC output voltage signal to produce a square voltage signal by means of an inverter means including four controllable high frequency bidirectional switch elements connected in a bridge configuration having two opposite input ends for receiving the DC output voltage signal, and two other opposite output ends for supplying the square voltage signal, each of the four switch elements having a gate for receiving a switch control signal at a controlled frequency determining the direct current signal supplied to the battery connect terminals;

(c) detecting the DC output voltage signal to produce an average voltage signal indicative of the DC output voltage signal;

(d) detecting a current signal at the input ends of the bridge configuration to produce an average current signal indicative of an average value of the current signal;

(e) controlling the four switch elements by means of the following steps:

(i) multiplying the average voltage signal by the average current signal to produce a battery power signal indicative of a power supplied to the battery connect terminals;

(ii) comparing the battery power signal to a reference power signal to produce a signal representative of a difference between the battery power signal and the reference power signal; and (iii) producing the switch control signals at the controlled frequency as a function of the signal produced in step (ii);

(f) applying the square voltage signal to an input of a resonant circuit to produce at its output an alternating current signal;

(g) applying the alternating current signal to a primary winding of an impedance matching transformer to deliver at its secondary winding a transformed alternating current signal;

(h) rectifying the transformed alternating current signal to produce a rectified current signal; and (j) low pass filtering the rectified current signal to produce the direct current signal supplied to the battery connect terminals.

According to the present invention, there is also provided a separable two-part battery charger for supplying a direct current signal to battery connect terminals, comprising a first part and a second part, wherein:

the first part includes:

a secondary winding of an impedance matching transformer, having an output for delivering a transformed alternating current signal;

a first magnetic core part of the impedance matching transformer, which is magnetically coupled to the secondary winding;

a current rectifier for rectifying the transformed alternating current signal and delivering a rectified current signal; and a low pass filter means for low pass filtering the rectified current signal to supply the direct current signal to the battery connect terminals; and the second part includes:

a power supply means for producing a DC output voltage signal;

an inverter resonant circuit means for inverting the DC output voltage signal and delivering an alternating current signal;

a primary winding of the impedance matching transformer, having an input for receiving the alternating current signal;

a second magnetic core part of the impedance matching transformer, which is magnetically coupled to the first primary winding, the second magnetic core part being mechanically connectable to the first magnetic core part;

a current detector for detecting a current flowing through the inverter resonant circuit means and delivering a current signal indicative of the current flowing through the inverter resonant circuit means;

a current averaging means for averaging the current signal delivered by the current detector and delivering an average current signal;

a comparing means for comparing the average current signal to a current reference signal and delivering a signal indicative of a difference between the average current signal and the current reference signal, the difference being representative of quality of mechanical coupling between the first and second magnetic core parts; and an indicator for indicating to a user the quality of mechanical coupling between the first and second magnetic core parts, the indicator having an input for receiving the signal delivered from the comparing means.

According to the present invention, there is also provided a method of operating a separable two-part battery charger for supplying a direct current signal to battery connect terminals, comprising steps of:

(a) providing a first part which includes:

a secondary winding of an impedance matching transformer, having an output for delivering a transformed alternating current signal;

a first magnetic core part of the impedance matching transformer, which is magnetically coupled to the secondary winding;

a current rectifier for rectifying the transformed alternating current signal and delivering a rectified current signal; and a low pass filter means for low pass filtering the rectified current signal to supply the direct current signal to the battery connect terminals;

(b) providing a second part which includes:

a power supply means for producing a DC output voltage signal;

an inverter resonant circuit means for inverting the DC output voltage signal and delivering an alternating current signal;

a primary winding of the impedance matching transformer, having an input for receiving the alternating current signal;

a second magnetic core part of the impedance matching transformer, which is magnetically coupled to the first primary winding, the second magnetic core part being mechanically connectable to the first magnetic core part;

(c) detecting a current flowing through the inverter resonant circuit means and delivering a current signal indicative of the current flowing through the inverter resonant circuit means;

(d) averaging the current signal delivered from step (c) and delivering an average current signal;

(e) comparing the average current signal to a current reference signal and delivering a signal indicative of a difference between the average current signal and the current reference signal, the difference being representative of quality of mechanical coupling between the first and second magnetic core parts; and (f) indicating to a user the quality of mechanical coupling between the first and second magnetic core parts, the indicating of step (f) being based on the signal delivered from step (e).

According to the present invention, there is also provided a separable two-part battery charger for supplying a direct current signal to battery connect terminals, comprising a first part and a second part, wherein:

the first part includes:

a secondary winding of an impedance matching transformer, having an output for delivering a transformed alternating current signal;

a first magnetic core part of the impedance matching transformer, which is magnetically coupled to the secondary winding;

a current rectifier for rectifying the transformed alternating current signal and delivering a rectified current signal; and a low pass filter means for low pass filtering the rectified current signal to supply the direct current signal to the battery terminals; and the second part includes: a power supply means for producing a DC output voltage signal;

an inverter resonant circuit means for inverting the DC output voltage signal and delivering an alternating current signal, the inverter resonant circuit means including controllable high frequency bidirectional switch elements, each of the switch elements having a gate for receiving a switch control signal at a controlled frequency determining the direct current signal supplied to the battery connect terminals;

a primary winding of the impedance matching transformer, having an input for receiving the alternating current signal;

a second magnetic core part of the impedance matching transformer, which is magnetically coupled to the first primary winding, the second magnetic core part being mechanically connectable to the first magnetic core part;

a tertiary winding of the impedance matching transformer, which is magnetically coupled to the second magnetic core part, the tertiary winding being for delivering a voltage signal indicative of a voltage at the battery connect terminals; and a controller for controlling the switch elements as a function of the voltage signal delivered by the tertiary winding.

According to the present invention, there is also provided a method of operating a separable two-part battery charger for supplying a direct current signal to battery connect terminals, comprising steps of:

(a) providing a first part which includes:
- a secondary winding of an impedance matching transformer, having an output for delivering a transformed alternating current signal;
- a first magnetic core part of the impedance matching transformer, which is magnetically coupled to the secondary winding;
- a current rectifier for rectifying the transformed alternating current signal and delivering a rectified current signal; and
- a low pass filter means for low pass filtering the rectified current signal to supply the direct current signal to the battery terminals;

(b) providing a second part which includes:
- a power supply means for producing a DC output voltage signal;
- an inverter resonant circuit means for inverting the DC output voltage signal and delivering an alternating current signal, the inverter resonant circuit means including controllable high frequency bidirectional switch elements, each of the switch elements having a gate for receiving a switch control signal at a controlled frequency determining the direct current signal supplied to the battery connect terminals;
- a primary winding of the impedance matching transformer, having an input for receiving the alternating current signal;
- a second magnetic core part of the impedance matching transformer, which is magnetically coupled to the first primary winding, the second magnetic core part being mechanically connectable to the first magnetic core part;
- a tertiary winding of the impedance matching transformer, which is magnetically coupled to the second magnetic core part, the tertiary winding being for delivering a voltage signal indicative of a voltage at the battery connect terminals; and (c) controlling the switch elements as a function of the voltage signal delivered by the tertiary winding.

According to the present invention, there is also provided a power factor correcting and voltage regulating apparatus comprising:
an apparatus input for receiving an AC power supply signal having a frequency and a peak value;
a first low pass filter means for low pass filtering high-frequency current components out of the AC power supply signal received at the apparatus input;
rectifying means for rectifying an AC signal delivered from the first low pass filter means, the rectifying means having an output for delivering a rectified voltage signal;
an inductor connected in series to the output of the rectifying means;
modulating means for modulating a current flowing through the inductor to produce a modulated alternating current through the inductor at a frequency higher than the one of the AC power supply signal and to produce a regulated voltage signal having a value equal or greater than the peak value of the AC power supply signal, the modulating means including a rectifying element connected to a controllable high frequency switch means to form a boost converter, the controllable high frequency switch means having a gate for receiving a switch control signal;
a second low pass filter means for low pass filtering alternating voltage components out of the regulated voltage signal, and delivering a DC output voltage signal; and
a voltage detecting means for detecting the DC output voltage signal and delivering an output signal indicative of the DC output voltage signal;
controlling means for controlling the controllable high frequency switch means to regulate the DC output voltage signal at a desired voltage signal by producing a discontinuous current through the inductor at a frequency substantially higher than the frequency of the AC power supply signal, the controlling means including:
- a comparing means for comparing the output signal of the voltage detecting means to a reference voltage signal and delivering a signal representative of a difference between the DC output voltage signal and the desired voltage signal; and
- a pulse width modulator for producing the at least one control signal as a function of the signal delivered by the comparing means.

According to the present invention, there is also provided a power factor correcting and voltage regulating method comprising steps of:
(a) receiving by means of an apparatus input an AC power supply signal having a frequency and a peak value;
(b) low pass filtering high-frequency current components out of the AC power supply signal received at the apparatus input;
(c) rectifying an AC signal delivered from step (b) to produce a rectified voltage signal at an output of a rectifying means;
(d) providing an inductor connected in series to the output of the rectifying means;
(e) modulating a current flowing through the inductor to produce a modulated alternating current through the inductor at a frequency higher than the one of the AC power supply signal and to produce a regulated voltage signal having a value equal or greater than the peak value of the AC power supply signal by means of a modulating means including a controllable high frequency switch means connected to a rectifying element to form a boost converter, the controllable high frequency switch means having a gate for receiving a switch control signal;
(f) low pass filtering alternating voltage components out of the regulated voltage signal, and delivering a DC output voltage signal; and
(g) controlling the controllable high frequency switch means to produce a discontinuous current through the inductor at a frequency substantially higher than the frequency of the AC power supply signal to regulate the DC output voltage signal at a desired voltage signal, the step (g) further including steps of:
  (i) detecting the DC output voltage signal delivered from step (f) and delivering an output signal indicative of the DC output voltage signal;
  (ii) comparing the output signal delivered in step (i) to a reference voltage signal to produce a signal representative of a difference between the DC output voltage signal and the desired voltage signal; and
  (iii) producing the control signal by means of a pulse width modulator as a function of the signal produced from step (ii).

The objects, advantages and other features of the present invention will become more apparent upon reading of the following non restrictive description of a preferred embodiment thereof, given for the purpose of exemplification only with reference to the accompanying drawings.

BRIEF DESCRIPTION OF THE DRAWINGS

FIGS. 9a and 9b are the algorithm of a correcting and voltage regulating method according to the present invention;

FIGS. 12a and 12b are an algorithm of a method for supplying a direct current signal to battery connect terminals according to the present invention;

FIGS. 14a and 14b are an algorithm of a method of operating a separable two-part battery charger for supplying a direct current signal to battery connect terminals according to the present invention;

FIGS. 15a and 15b are an algorithm of another method of operating a separable two-part battery charger for supplying a direct current signal to battery connect terminals according to the present invention;

FIGS. 18a, 18b and 18c are an algorithm of another correcting and voltage regulating method according to the present invention;

FIGS. 20a and 20b and 21 are an algorithm performed by the controller shown in FIG. 19;

DETAILED DESCRIPTION OF THE DRAWINGS

Figure 1:
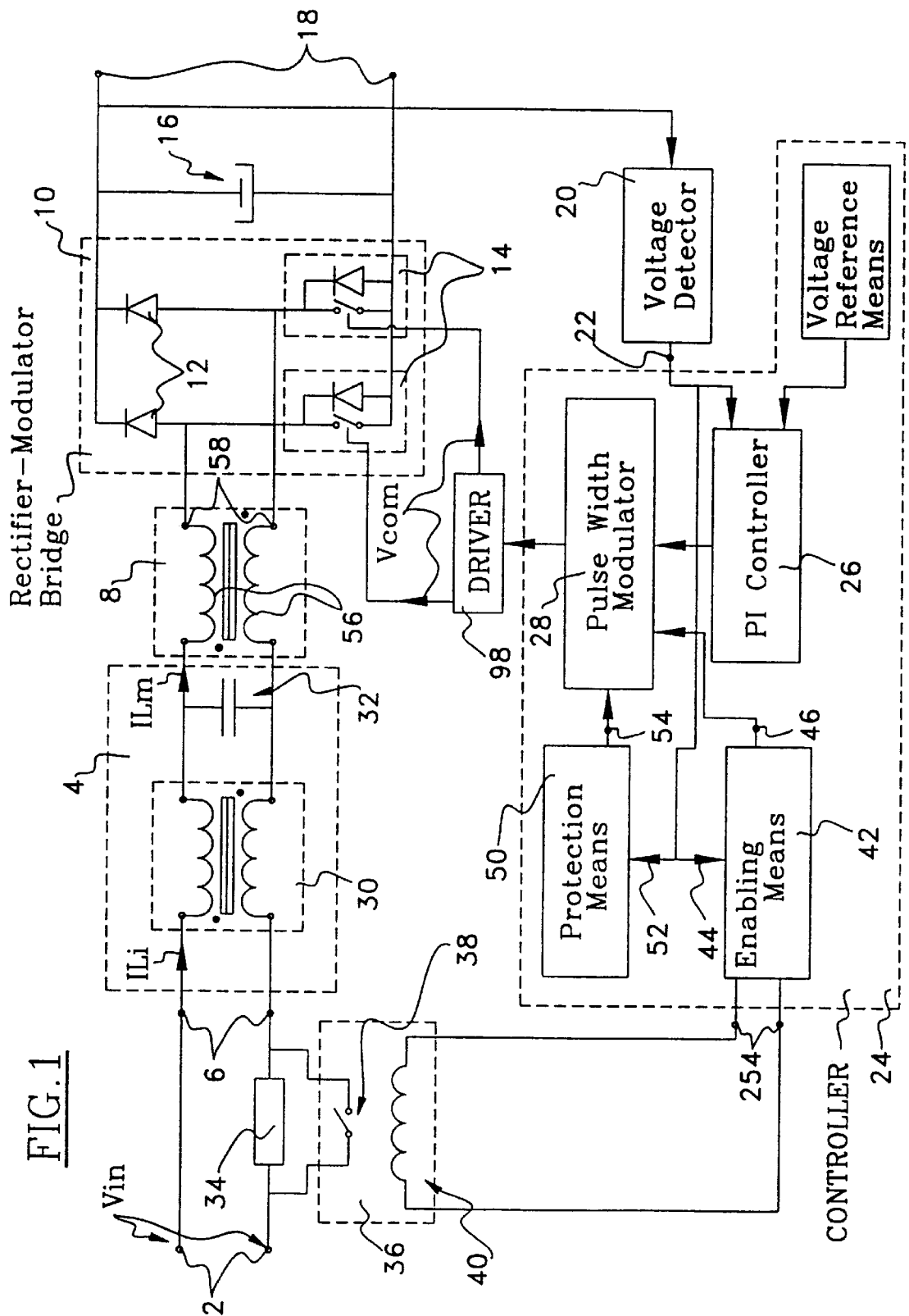
FIG. 1 is a circuit and block diagram showing a power factor correcting and voltage regulating apparatus according to the present invention.

Referring now to FIG. 1, there is shown a power factor correcting and voltage regulating apparatus. It comprises an apparatus input 2 for receiving an AC power supply signal having a frequency and a peak value. A first low pass filter 4 having an input 6 connected to the apparatus input 2 for low pass filtering high-frequency current components out of the AC power supply signal received at the apparatus input 2. The low pass filter has also an output.

An inductor 8 is connected to the output of the low pass filter 4. A rectifying-modulating bridge circuit 10 is provided for modulating an alternating current flowing through the inductor 8 at a frequency higher than the one of the AC power supply signal, rectifying this alternating current, and delivering a regulated voltage signal having a value equal or greater than the peak value of the AC power supply signal. The bridge circuit 10 includes two rectifying elements 12 connected respectively to two controllable high frequency bidirectional switch elements 14 to form a pair of boost converters. Each of the switch elements 14 has a gate for receiving a switch control signal.

A second low pass filter 16 is provided for low pass filtering alternating voltage components out of the regulated voltage signal. It has an output 18 for delivering a DC output voltage signal.

A voltage detector 20 is provided for detecting the DC output voltage signal. It has an output 22 for delivering an output signal indicative of the DC output voltage signal. A controller is provided for controlling the switch elements 14 to regulate the DC output voltage signal at a desired voltage signal by producing a discontinuous current through the inductor 8 at a frequency substantially higher than the frequency of the AC power supply signal. The controller includes a PI controller 26 for comparing the output signal of the voltage detector 20 to a reference voltage signal and delivering a signal representative of a difference between the DC output voltage signal and the desired voltage signal. A pulse width modulator 28 is provided for producing the switch control signals via a driver 98 as a function of the signal delivered by the PI controller 26.

Preferably, the low pass filter 4 is a symmetrical low pass filter comprising a symmetrical inductor 30 having two windings magnetically coupled together, each of the two windings having first and second ends, the first ends being respectively connected to terminals of the apparatus input 2; and a capacitor 32 connected between the second ends of the two windings.

Preferably, a resistor 34 is connected in series with a terminal of the apparatus input 2. A relay 36 is provided. It has a normally open switch 38 connected in parallel to the resistor 34, and a command coil 40 for controlling operation of the switch 38. The controller 24 further comprises an enabling means 42 for closing the switch 38. The enabling means 42 has an input 44 for detecting operating condition of the apparatus, and a command output 254 connected to the command coil 40 for closing the switch 38 in function of the operating condition. The input 44 of the enabling means 42 is connected to the output 22 of the voltage detector 20.

Preferably, the controller 24 further comprises a protection means 50 for preventing an undesired operation of the apparatus. It has an input 52 connected to the output 22 of the voltage detector 20, and an output 54 connected to the pulse width modulator 28 for controlling it in respect of the signal received at its input 52.

Preferably, the inductor 8 is a symmetrical inductor having two windings 56 magnetically coupled together. Each of the two windings 56 has first and second ends. The first ends are respectively connected to the output of the low pass filter 4. The second ends are respectively connected to input terminals 58 of the rectifying-modulating bridge circuit 10.

Figure 2A:
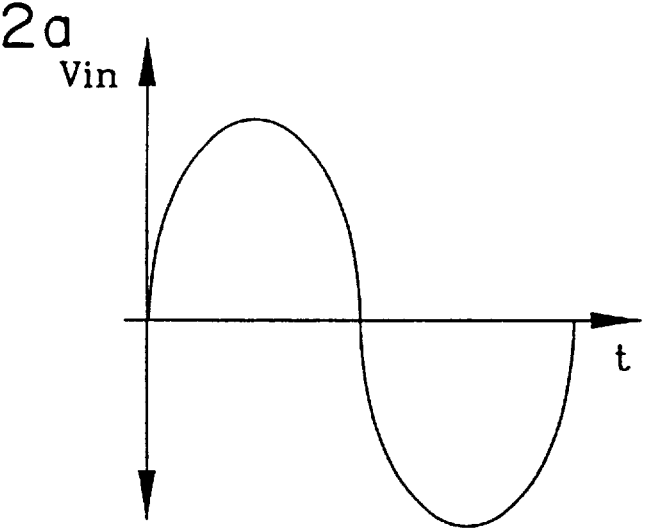
FIGS. 2a, 2b, 2c, are diagrams showing signals present in the apparatus shown in FIG. 1 during operation thereof.
Figure 2B:
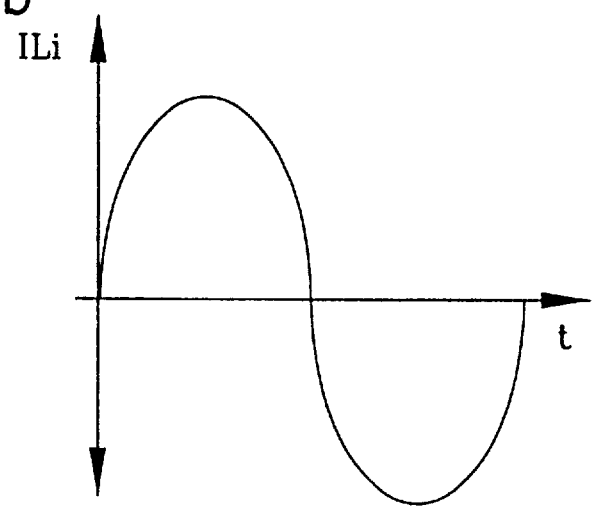

Referring now to FIGS. 2a, b and c, there are shown, in relation to FIG. 1, respectively the voltage signal Vin and current signals ILi and ILm, with respect to time.

Figure 3A:
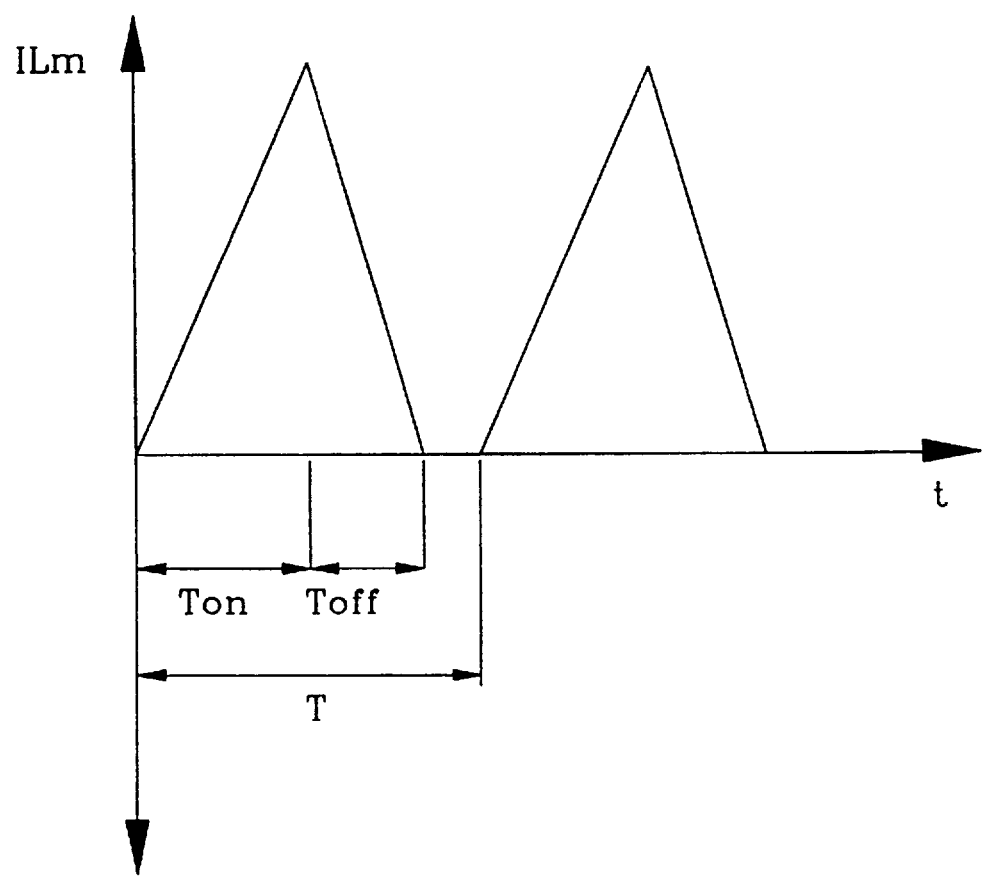
FIGS. 3a and 3b are diagrams showing signals present in the apparatus shown in FIG. 1 during operation thereof.

Referring now to FIGS. 3a and b, there are shown, in relation to FIG. 1, respectively the current signals ILm and Vcom with respect to time.

Figure 3B:
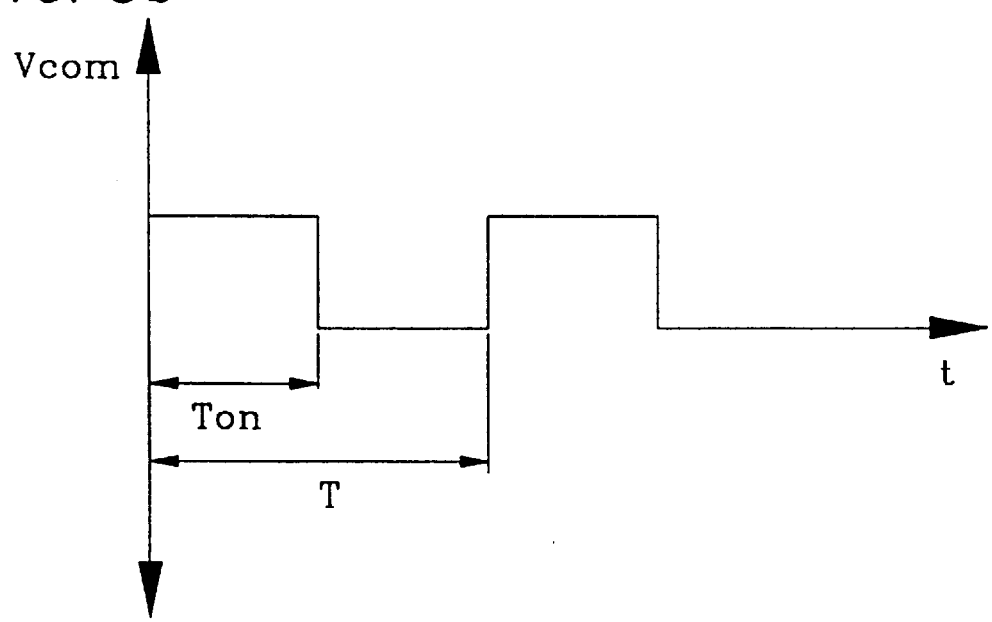
Figure 4:
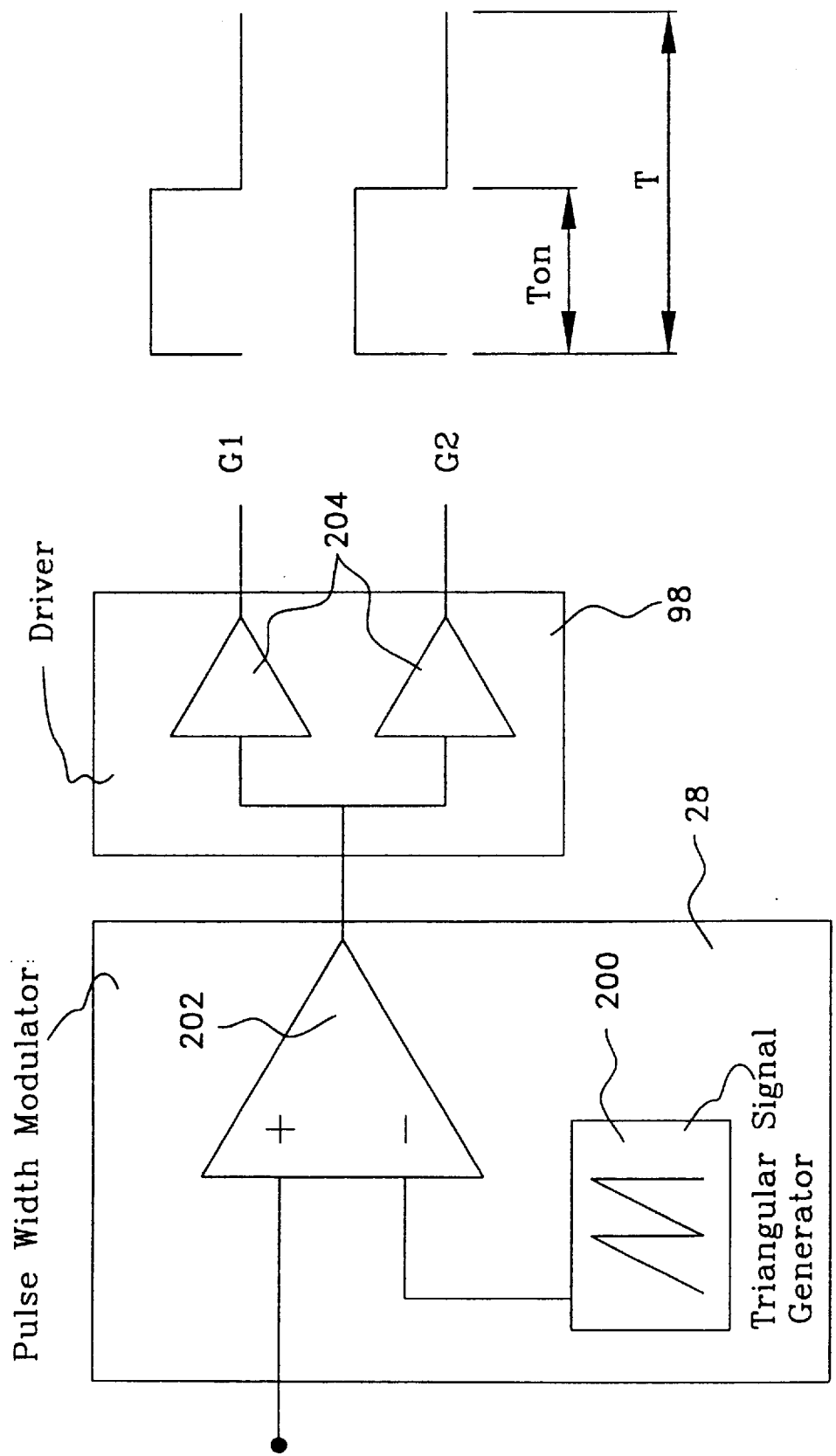
FIG. 4 is a schematic diagram illustrating the PWM generator and the driver shown in FIG. 1, with two output signals of the driver.
Figure 5:
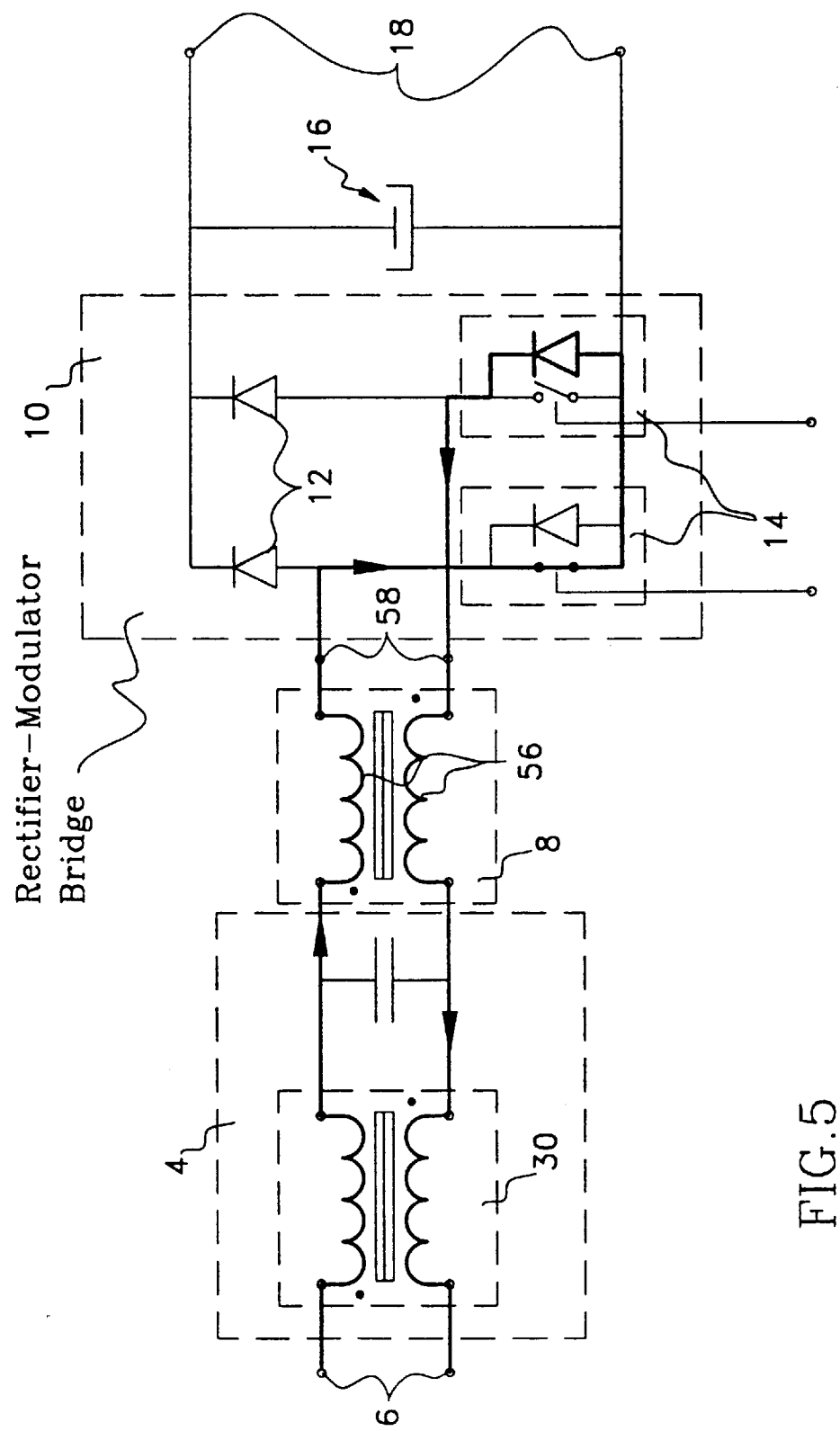
FIG. 5 is a circuit diagram showing a part of the circuit shown in FIG. 1, with the current direction in a first operating position.
Figure 6:
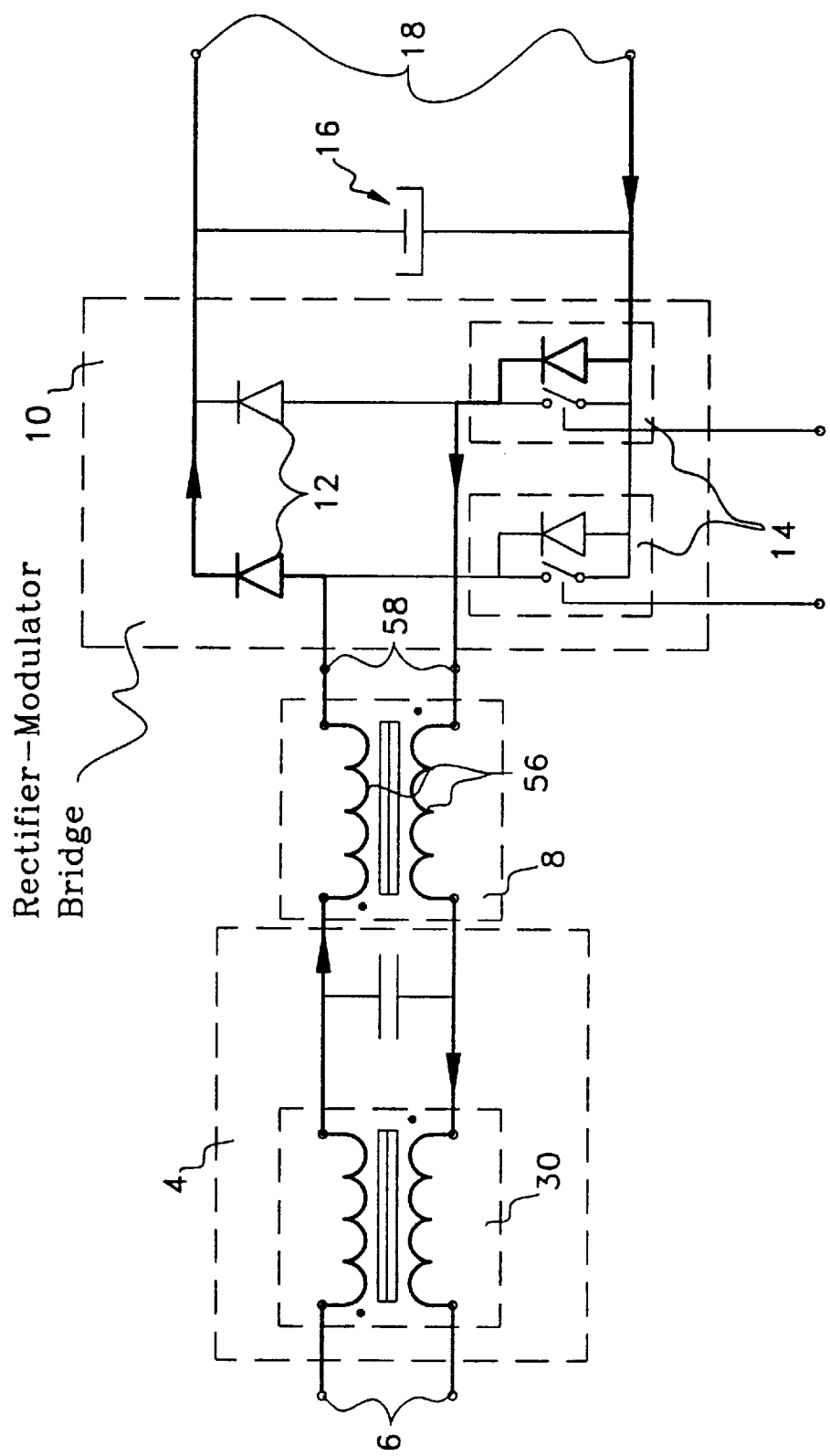
FIG. 6 is a circuit diagram showing a part of the circuit shown in FIG. 1, with the current direction in a second operating position.
Figure 7:
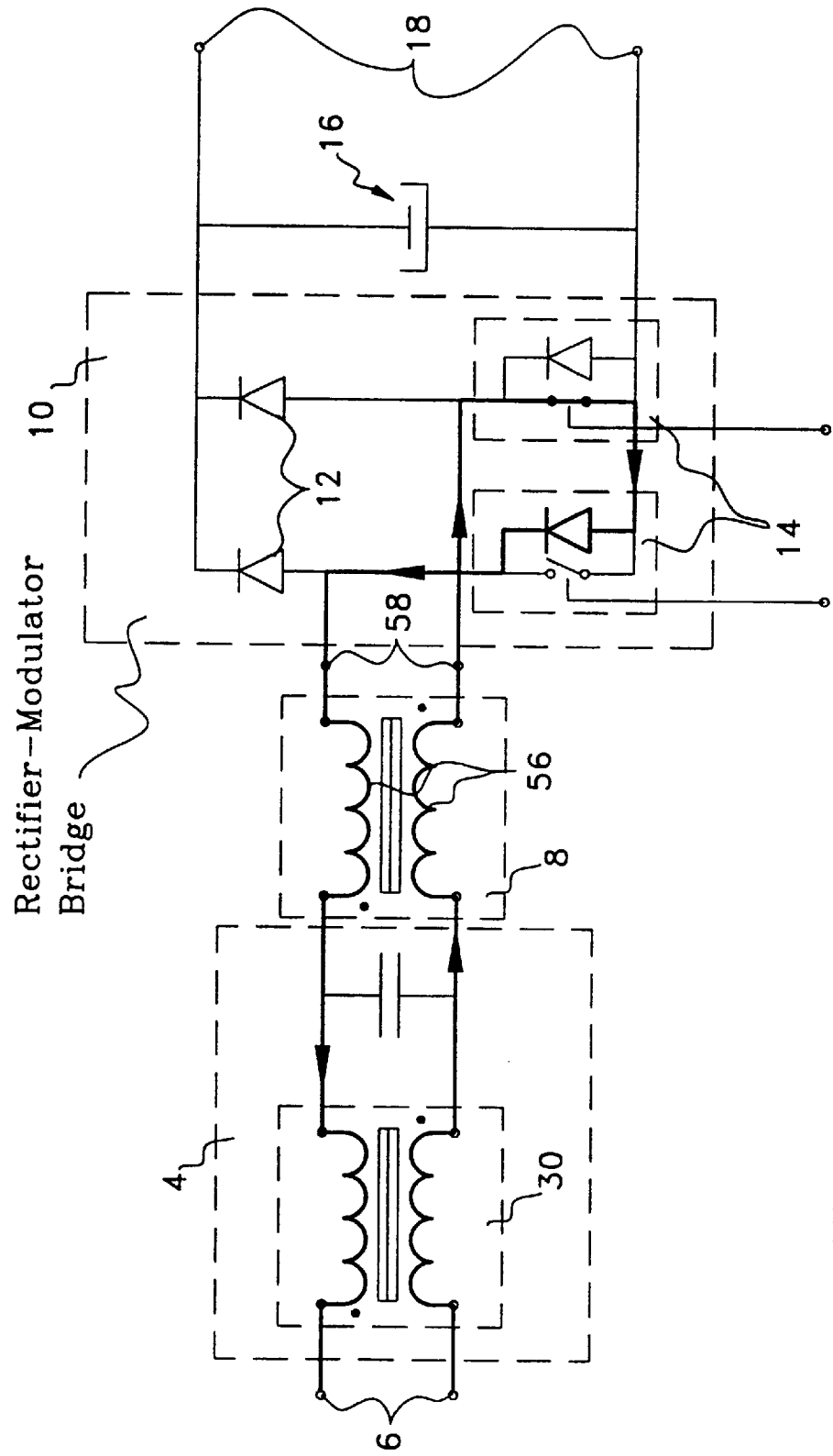
FIG. 7 is a circuit diagram showing a part of the circuit shown in FIG. 1, with the current direction in a third operating position.
Figure 8:
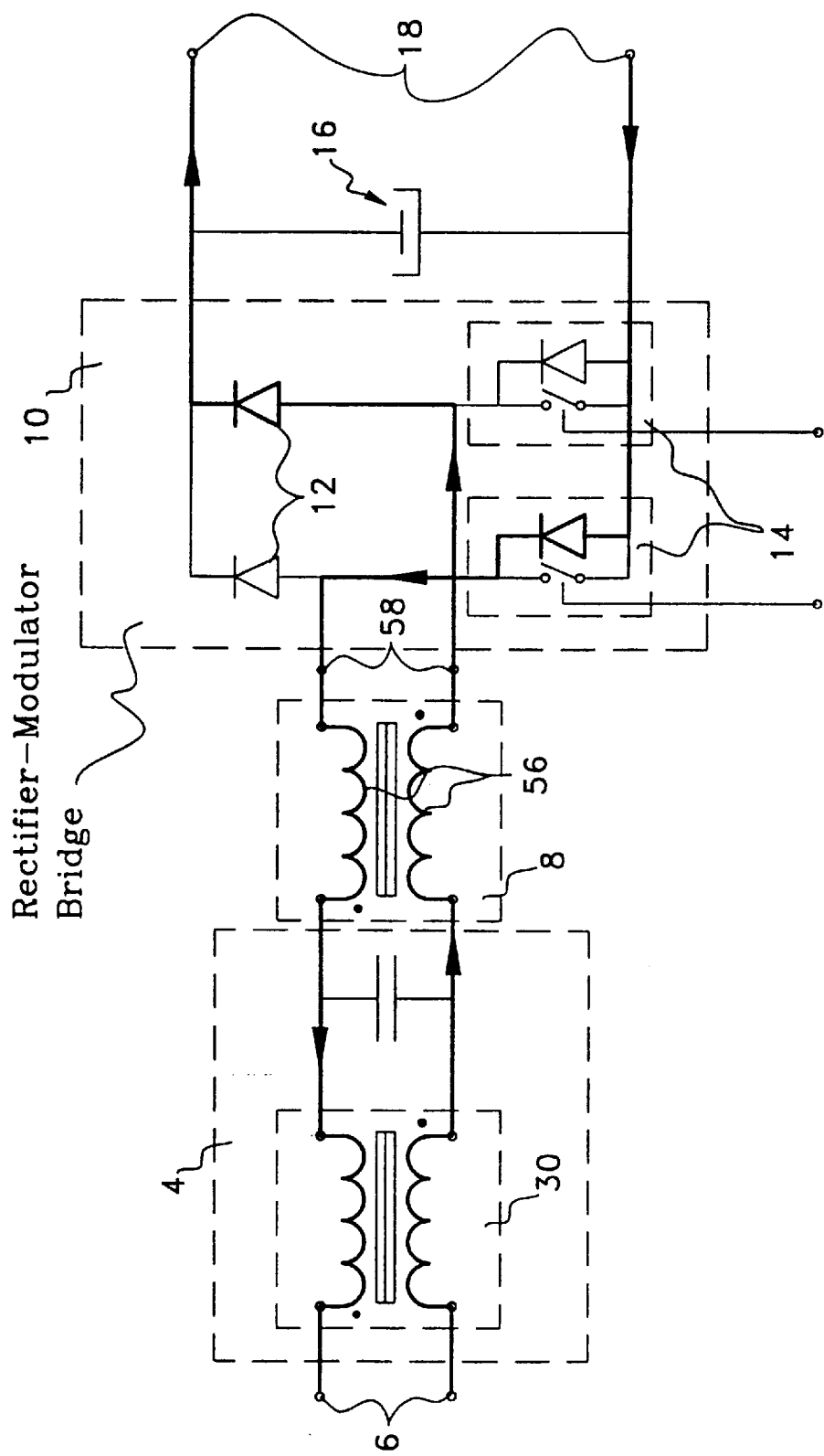
FIG. 8 is a circuit diagram showing a part of the circuit shown in FIG. 1, with the current direction in a fourth operating position.

Referring now to FIG. 4, there is shown with more details the pulse width modulator 28 and the driver 98, with the switch control signals present on terminals G1 and G2. These switch control signals are also shown on FIG. 3b. The pulse width modulator 28 comprises a triangular signal generator 200 and a comparator 202. The driver 98 comprises two amplifiers 204.

Figure 2C:
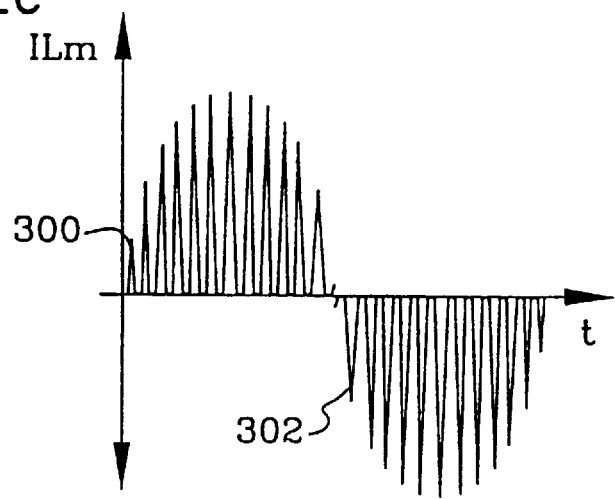

Referring now to FIGS. 2c, 5, 6, 7 and 8, the triangular wave form shown in FIG. 2c will be described with respect to the different operating positions shown respectively in FIG. 5, 6, 7 and 8. In the operating position shown in FIG. 5, the current Ilm shown in FIG. 2c is increasing from a zero value to a first amplitude 300. In the next operating position shown in FIG. 6, the amplitude of current Ilm goes from the first amplitude to a zero value. In the next operating position shown in FIG. 7, the amplitude of current Ilm goes from a zero value to a second amplitude 302. Then, in the next operating position shown in FIG. 8, the amplitude of current Ilm goes from the second amplitude to a zero value. This operation continues to produce a triangular wave form as shown in FIG. 2c. During the first positive half of the wave form, the circuit is set alternately to the positions shown in FIGS. 5 and 6. In the negative half of the wave form, the circuit is operated alternately in the positions shown in FIG. 7 and 8.

Figure 9B:
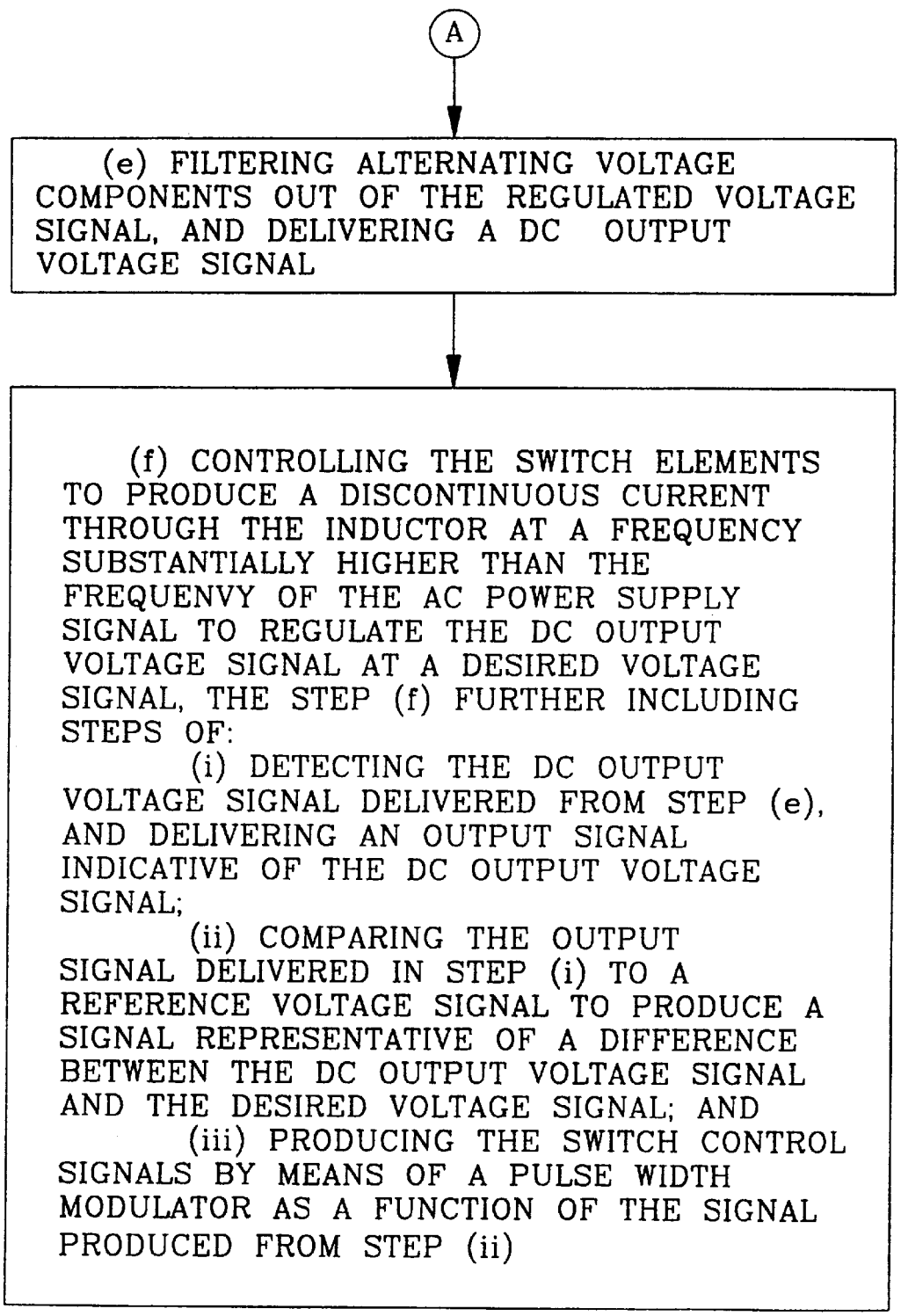

Referring now to FIG. 9, there is shown the algorithm of a power factor correcting and voltage regulating method. This method will be described with respect to the apparatus shown in FIG. 1 but it should not be limited to the apparatus of FIG. 1. The method comprises steps of:

(a) receiving by means of an apparatus input 2 an AC power supply signal having a frequency and a peak value;

(b) low pass filtering high-frequency current components out of the AC power supply signal received at the apparatus input 2 by means of a low pass filter 4 having an input connected to the apparatus input 2, and an output;

(c) providing an inductor 8 connected to the output of the low pass filter 4;

(d) modulating an alternating current flowing through the inductor 8 at a frequency higher than the one of the AC power supply signal, and rectifying this alternating current to deliver a regulated voltage signal having a value equal or greater than the peak value of the AC power supply signal by means of a rectifying-modulating bridge circuit 10, the bridge circuit 10 including two rectifying elements 12 connected respectively to two controllable high frequency bidirectional switch elements 14 to form a pair of boost converters, each of the switch elements 14 having a gate for receiving a switch control signal;

(e) filtering alternating voltage components out of the regulated voltage signal, and delivering a DC output voltage signal; and (f) controlling the switch elements 14 to produce a discontinuous current through the inductor 8 at a frequency substantially higher than the frequency of the AC power supply signal to regulate the DC output voltage signal at a desired voltage signal, the step (f) further including steps of:

(i) detecting the DC output voltage signal delivered from step (e), and delivering an output signal indicative of the DC output voltage signal;

(ii) comparing the output signal delivered in step (i) to a reference voltage signal to produce a signal representative of a difference between the DC output voltage signal and the desired voltage signal; and (iii) producing the switch control signals by means of a pulse width modulator 28 as a function of the signal produced from step (ii).

Preferably, the method further comprises steps of (g) providing a resistor 34 connected in series with a terminal of the apparatus input 2; (h) providing a relay 36 having a normally open switch 38 connected in parallel to the resistor 34; (j) detecting operating condition of the apparatus; and (k) closing the switch 38 in function of the operating condition detected in step (j). Step (j) is performed by detecting the DC output voltage signal delivered from step (e).

Preferably, the method further comprises steps of (G) detecting operating condition of the apparatus; and (H) controlling the pulse width modulator 28 in respect of the operating condition detected in step (G) to prevent an undesired operation of the apparatus.

Figure 10A:
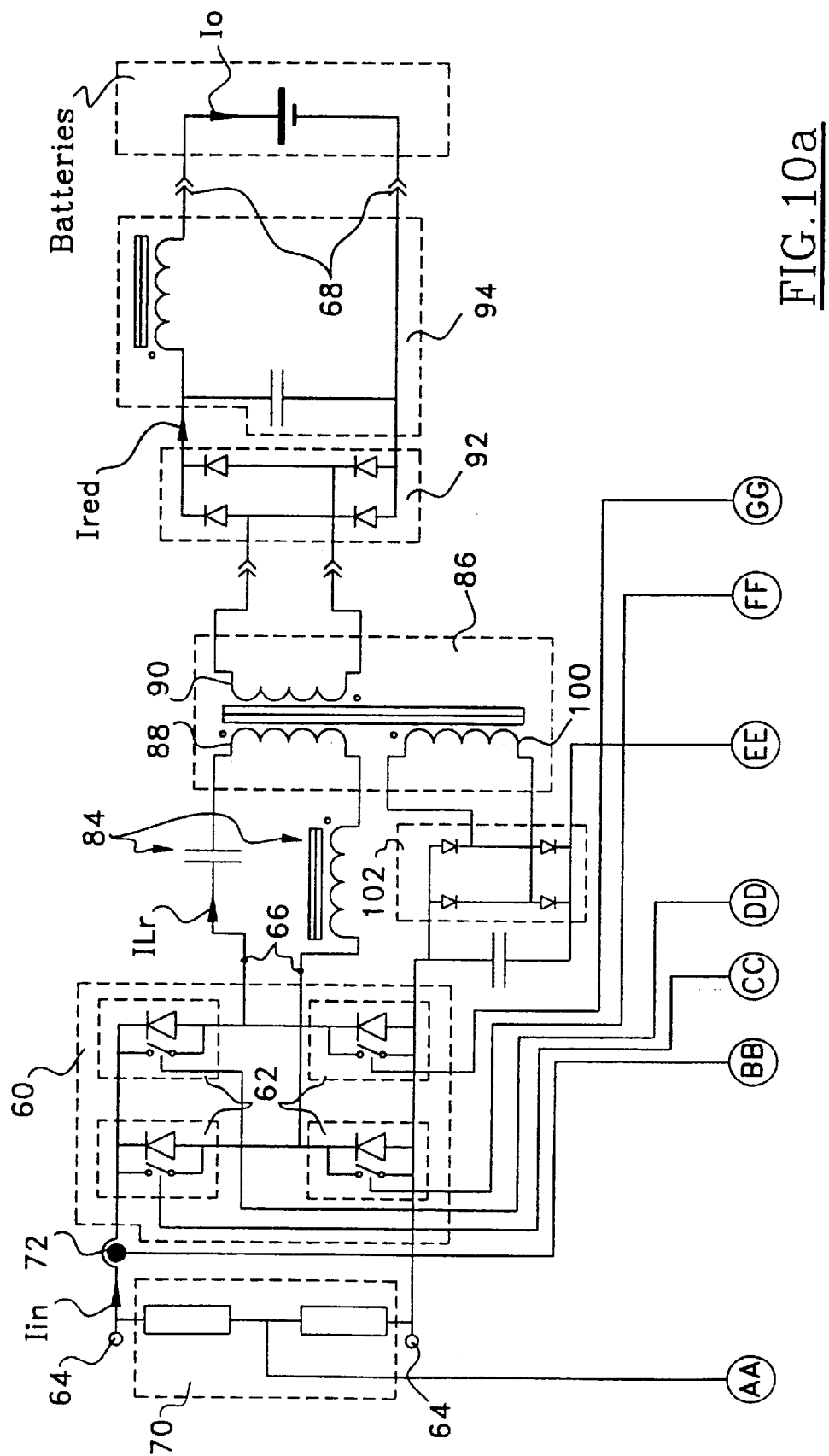
FIGS. 10a and 10b are circuit and block diagrams showing a part of a battery charger according to the present invention.
Figure 10B:
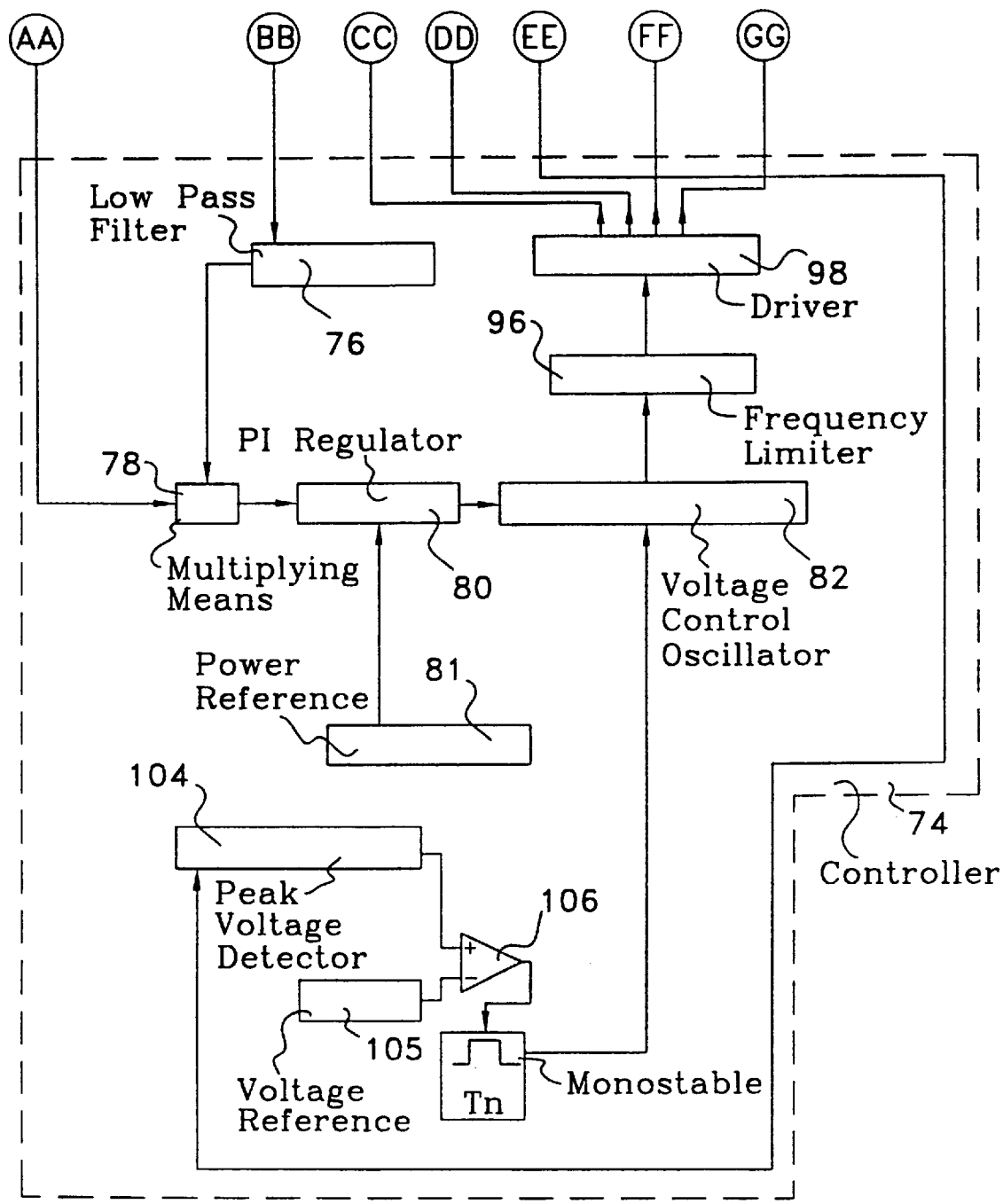

Referring now to FIGS. 10a and 10b, there is shown a part of a battery charger for supplying a direct current signal to battery connect terminals 68. The battery charger comprises a voltage regulating means such as, for example, the one shown in FIG. 1 or 16 for producing a DC output voltage signal from an AC power supply signal.

An inverter 60 is provided for inverting the DC output voltage signal and delivering a square voltage signal. The inverter 60 includes four controllable high frequency bidirectional switch elements 62 connected in a bridge configuration having two opposite input ends 64 for receiving the DC output voltage signal, and two other opposite output ends 66 for supplying the square voltage signal. Each of the four switch elements 62 having a gate for receiving a switch control signal at a controlled frequency determining the direct current signal supplied to the battery connect terminals 68.

A voltage detecting means 70 is provided for detecting the DC output voltage signal and delivering a voltage signal indicative of the DC output voltage signal. A current detector 72 is provided for detecting a current signal at the input ends 64 of the bridge configuration and delivering a signal indicative of the current signal.

A controller 74 is provided for controlling the four switch elements 62. It comprises a current averaging means embodied by a low pass filter 76 for averaging the signal delivered by the current detector 72 and delivering an average current signal indicative of an average value of the current signal.

A multiplying means 78 is provided for multiplying the voltage signal delivered by the voltage detecting means 70 by the average current signal delivered by the low pass filter 76 and delivering a battery power signal indicative of a power supplied to the battery connect terminals 68. A PI regulator 80 is provided for comparing the battery power signal to a reference power signal supplied by a power reference 81 and delivering a signal representative of a difference thereof.

A voltage control oscillator 82 is provided. It has an output for delivering the switch control signals at the controlled frequency as a function of the signal delivered by the PI regulator 80.

A resonant circuit 84 is provided. It has an input for receiving the square voltage signal and an output for producing an alternating current signal. An impedance matching transformer 86 is provided. It has a primary winding 88 for receiving the alternating current signal, and a secondary winding 90 for delivering a transformed alternating current signal.

A current rectifier 92 is provided for rectifying the transformed alternating current signal and delivering a rectified current signal. A low pass filter 94 is provided for low pass filtering the rectified current signal and delivering the direct current signal supplied to the battery connect terminals 68.

Preferably, the voltage detecting means 70 is a voltage divider having two resistors connected in series. The resonant circuit 84 comprises a capacitor and an inductor connected in series.

Preferably, the current rectifier 92 includes four diodes connected according to a diode bridge configuration having an output. The low pass filter 94 comprises a capacitor connected in parallel to the output of the diode bridge configuration, and an inductance connected in series to the battery connect terminals 68.

Preferably, the controller 74 comprises a frequency limiter 96 having an input connected to the output of the oscillator 82, and an output for delivering the switch control signals at a frequency which is limited under a predetermined threshold value. A driver 98 which is a monostable driver is provided. It has an input connected to the output of the limiter 96, and outputs connected to the gates of the four controllable high frequency bidirectional switch elements 62.

Preferably, a tertiary winding 100 of the impedance matching transformer 86 is provided. It is magnetically coupled to the primary and secondary windings 88 and 90. The tertiary winding 100 is for delivering a voltage signal indicative of a voltage at the battery connect terminals 68. A voltage rectifier 102 is provided. It has an input for receiving the signal delivered by the tertiary winding 100, and an output for delivering a rectified signal.

Preferably, the controller 74 further comprises a peak voltage detector 104 for detecting a peak voltage of the rectified signal delivered by the voltage rectifier 102 and delivering a peak signal representative of the peak voltage of the signal delivered by the tertiary winding 100. A comparator 106 is provided for comparing the peak signal delivered by the peak voltage detector 104 to a predetermined threshold signal provided by a voltage reference 105, and delivering an output signal when the peak signal reaches the threshold signal. The output signal of the comparator 106 preventing operation of the oscillator 82.

Figure 11A:
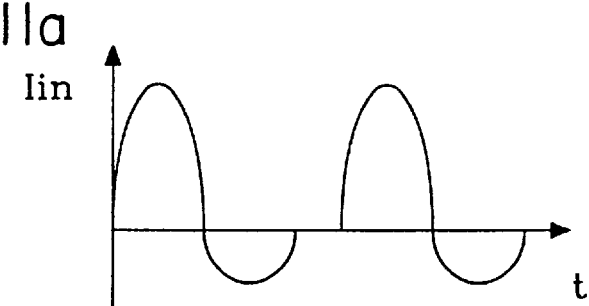
FIGS. 11a, 11b, 11c and 11d are diagrams showing signals present in the battery charger shown in FIG. 10 during operation thereof.
Figure 11B:
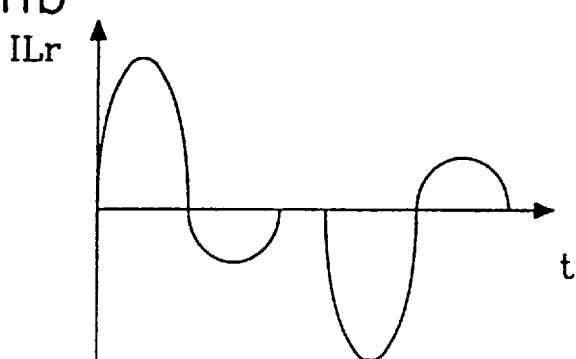
Figure 11C:
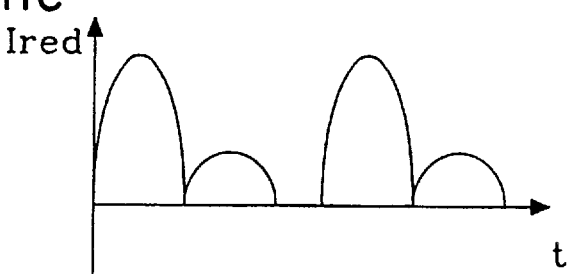
Figure 11D:
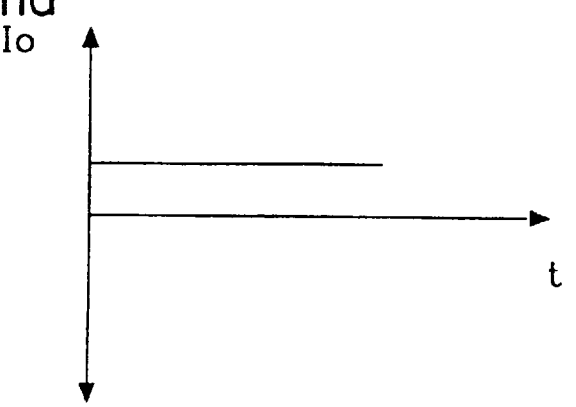

Referring now to FIGS. 11a, b, c and d, there are shown, in relation to FIG. 10, respectively the current signal signals Iin, Ilr, Ired and Io, with respect to time.

Figure 12A:
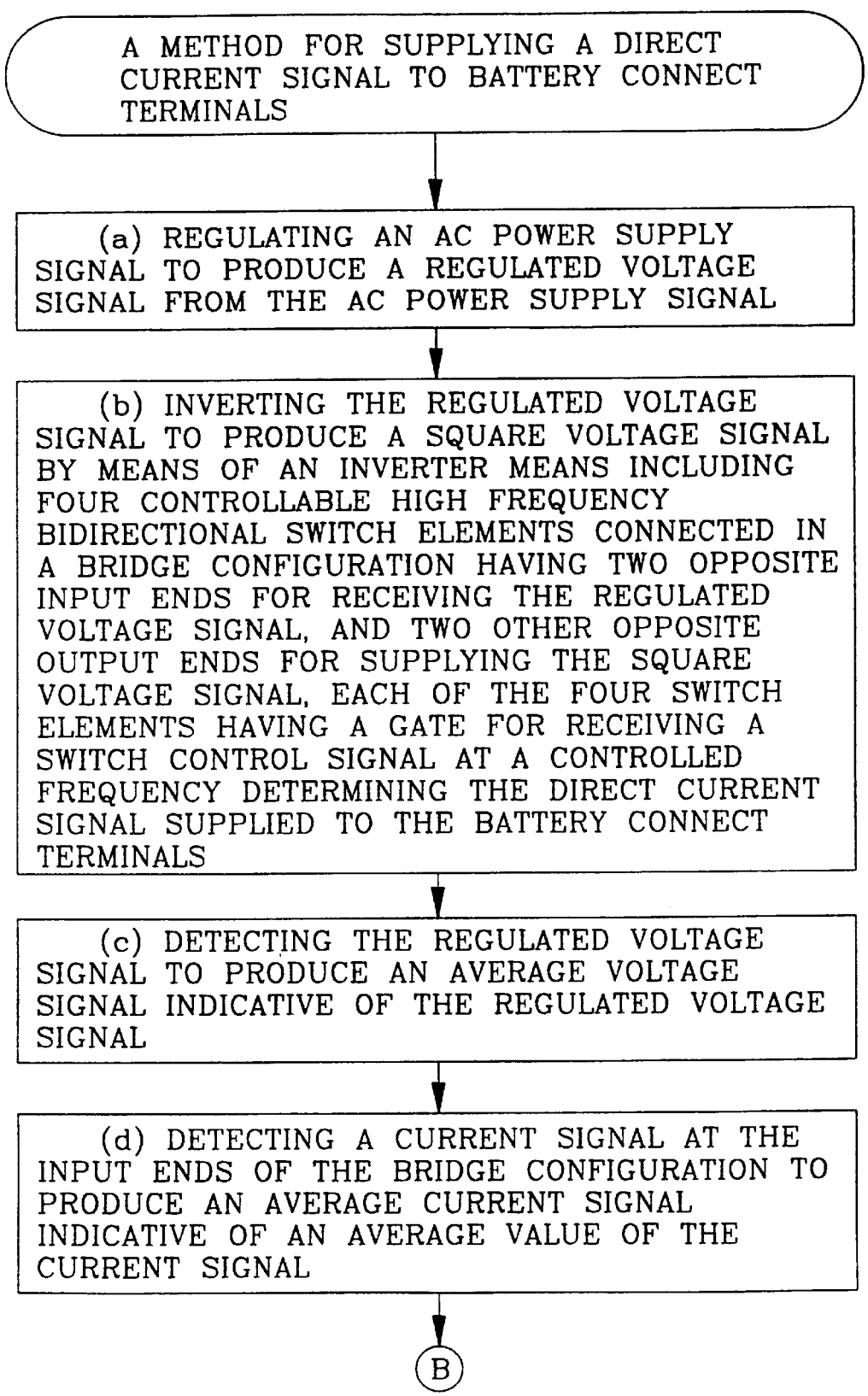

Referring now to FIG. 12, there is shown a method for supplying a direct current signal to battery connect terminals. The method will be described in relation to the apparatus shown in FIG. 10 but it should not be limited to this apparatus. The method comprises steps of:
(a) regulating an AC power supply signal to produce a DC output voltage signal from the AC power supply signal;
(b) inverting the DC output voltage signal to produce a square voltage signal by means of an inverter 60 including four controllable high frequency bidirectional switch elements 62 connected in a bridge configuration having two opposite input ends 64 for receiving the DC output voltage signal, and two other opposite output ends 66 for supplying the square voltage signal, each of the four switch elements 62 having a gate for receiving a switch control signal at a controlled frequency determining the direct current signal supplied to the battery connect terminals 68;
(c) detecting the DC output voltage signal to produce an average voltage signal indicative of the DC output voltage signal;
(d) detecting a current signal at the input ends 64 of the bridge configuration to produce an average current signal indicative of an average value of the current signal;
(e) controlling the four switch elements 62 by means of the following steps:
  (i) multiplying the average voltage signal by the average current signal to produce a battery power signal indicative of a power supplied to the battery connect terminals 68;
  (ii) comparing the battery power signal to a reference power signal provided by the power reference 81 to produce a signal representative of a difference between the battery power signal and the reference power signal; and
  (iii) producing the switch control signals at the controlled frequency as a function of the signal produced in step (ii);
(f) applying the square voltage signal to an input of a resonant circuit 84 to produce at its output an alternating current signal;
(g) applying the alternating current signal to a primary winding 88 of an impedance matching transformer 86 to deliver at its secondary winding 90 a transformed alternating current signal;
(h) rectifying the transformed alternating current signal to produce a rectified current signal; and
(j) low pass filtering the rectified current signal to produce the direct current signal supplied to the battery connect terminals 68.

Preferably, step (e) of the method further comprises step of (iv) limiting the controlled frequency of the switch control signals under a predetermined threshold value. Preferably, the method further comprising steps of (k) providing a tertiary winding 100 to the impedance matching transformer 86, which is magnetically coupled to the primary and secondary windings 88 and 90, the tertiary winding 100 being for delivering a voltage signal indicative of a voltage at the battery connect terminals 68; (l) detecting a peak voltage of the signal delivered by the tertiary winding 100 and delivering a peak signal representative of the peak voltage of the signal delivered by the tertiary winding 100; and (m) comparing the peak signal delivered in step (l) to a predetermined threshold signal, and delivering an output signal when the peak signal reaches the threshold signal, the output signal delivered in step (m) preventing the producing of switch control signals of step (e) (iii).

Preferably, the step (a) of the method comprises steps shown in FIG. 9 or 18. Also preferably, the method further comprises the steps shown in FIG. 14 or 15.

Figure 13A:
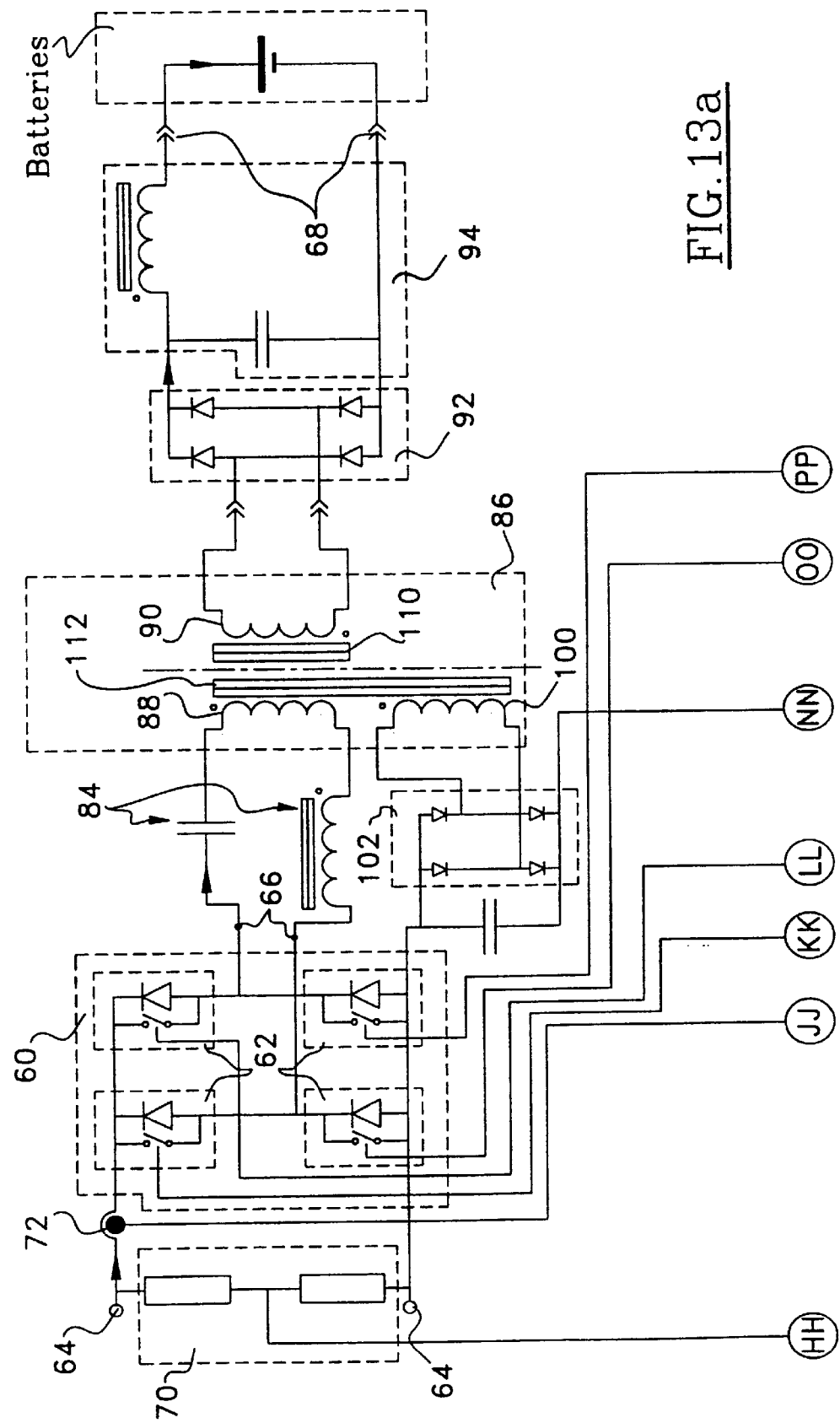
FIGS. 13a and 13b are circuit and block diagrams showing a part of a battery charger according to the present invention.
Figure 13B:
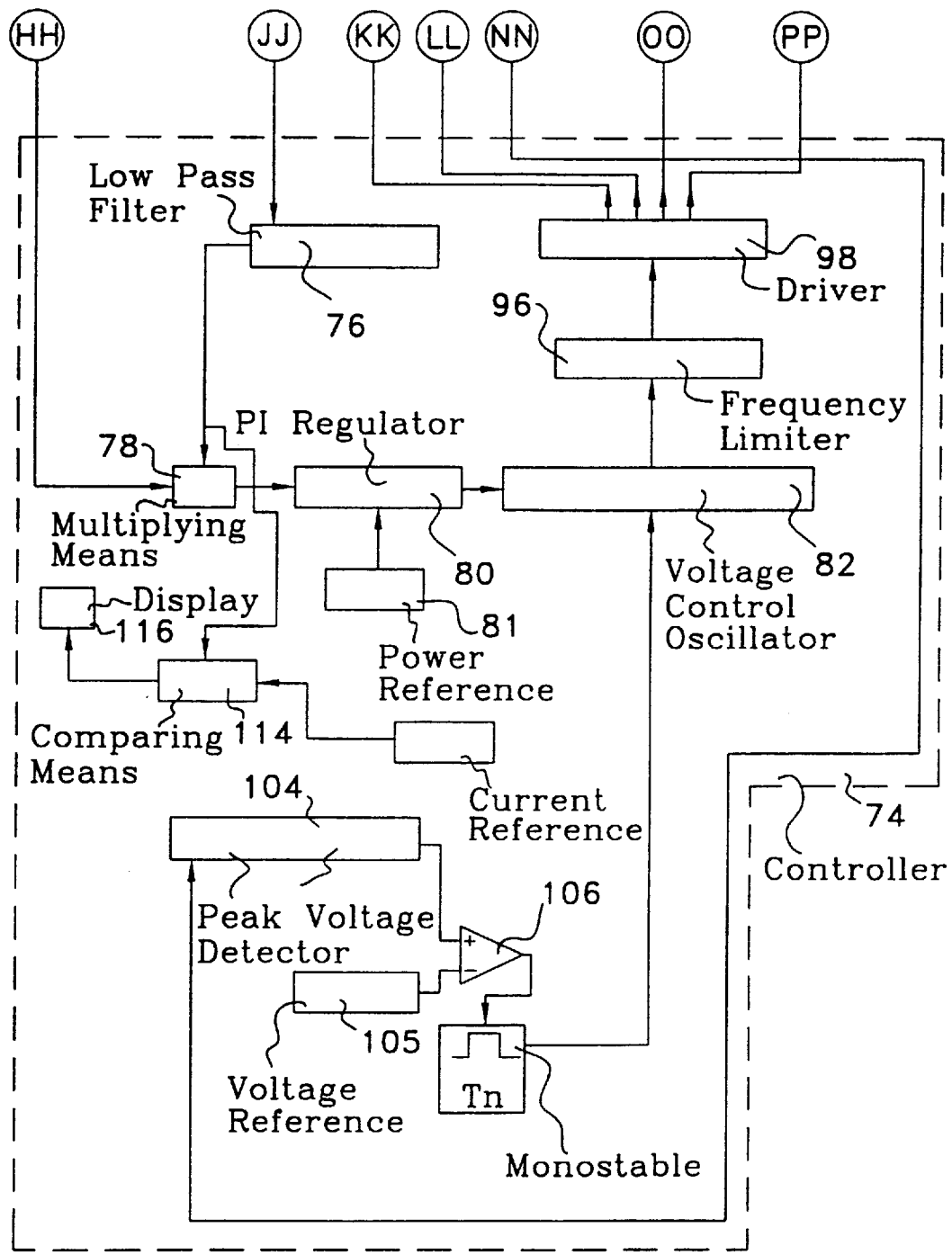

Referring now to FIGS. 13a and 13b, there is shown a separable two-part battery charger for supplying a direct current signal to battery connect terminals 68. It comprises a first part and a second part.

The first part includes a secondary winding 90 of an impedance matching transformer 86, having an output for delivering a transformed alternating current signal; a first magnetic core part 110 of the impedance matching transformer 86, which is magnetically coupled to the secondary winding 90; a current rectifier 92 for rectifying the transformed alternating current signal and delivering a rectified current signal; and a low pass filter 94 for low pass filtering the rectified current signal to supply a direct current signal to the battery connect terminals 68.

Figure 16:
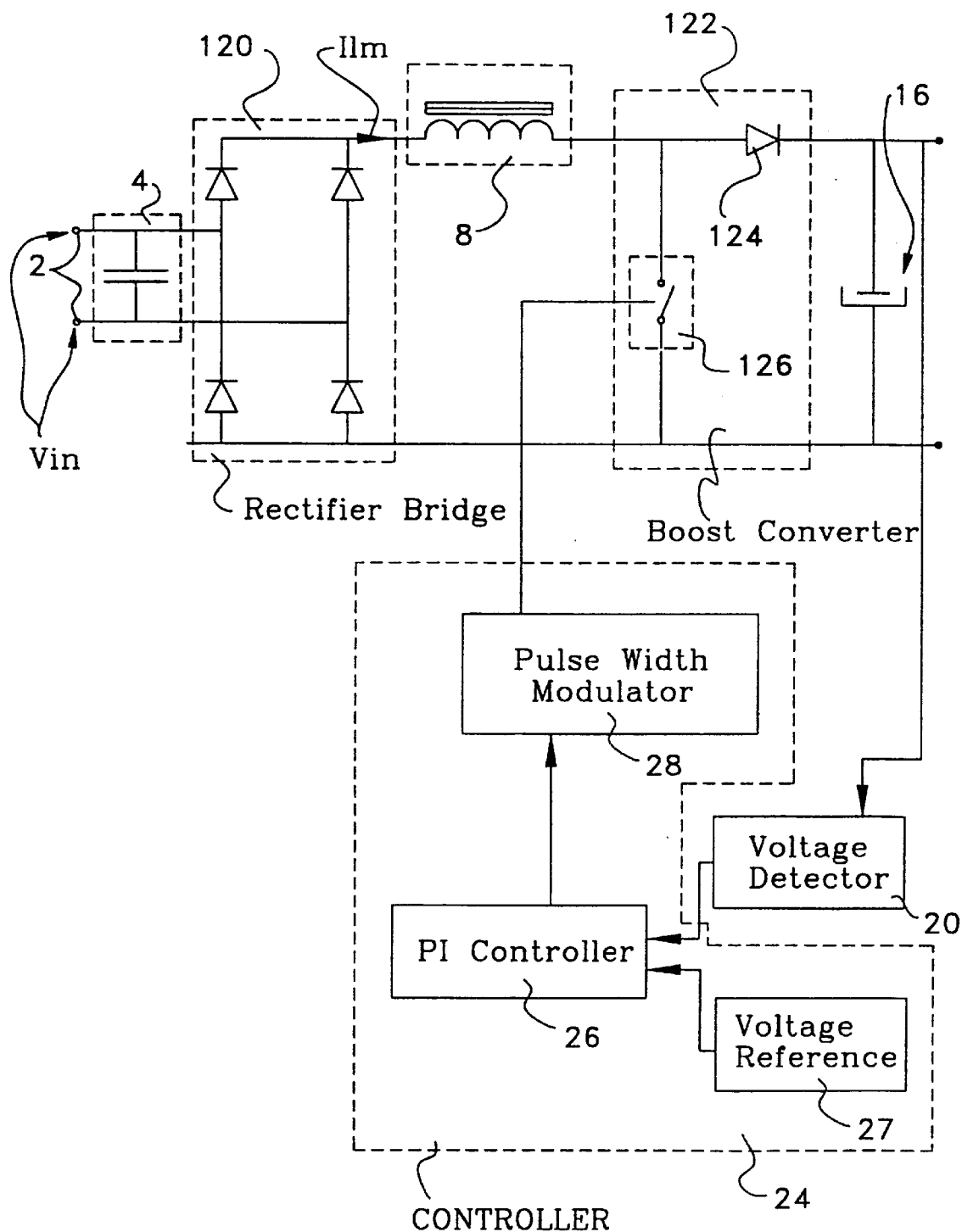
FIG. 16 is a circuit and block diagram showing another power factor correcting and voltage regulating apparatus according to the present invention.

The second part includes a voltage regulating means such as the one shown, for example, in FIG. 1 or 16 for producing a DC output voltage signal from an AC power supply signal; an inverter resonant circuit 60 and 84 for inverting the DC output voltage signal and delivering an alternating current signal; a primary winding 88 of the impedance matching transformer 86, having an input for receiving the alternating current signal; and a second magnetic core part 112 of the impedance matching transformer 86, which is magnetically coupled to the first primary winding 88, the second magnetic core part 112 being mechanically connectable to the first magnetic core part 110. The second part also includes a current detector 72 for detecting a current signal flowing through the inverter resonant circuit 60 and 84, and delivering a current signal indicative of the current flowing through the inverter resonant circuit 60 and 84; a current averaging means which is embodied by a low pass filter 76 for averaging the current signal delivered by the current detector 72 and delivering an average current signal; and comparing means 114 for comparing the average current signal to a current reference signal and delivering a signal indicative of a difference between the average current signal and the current reference signal. The difference is representative of quality of mechanical coupling between the first and second magnetic core parts 110 and 112.

The second part also includes an indicator such as a display 116 for indicating to a user the quality of mechanical coupling between the first and second magnetic core parts 110 and 112. The display 116 has an input for receiving the signal delivered from the comparing means 114.

Preferably, the inverter resonant circuit 60 and 84 comprises an inverter 60 for inverting the DC output voltage signal and delivering a square voltage signal. The inverter 60 includes four controllable high frequency bidirectional switch elements 62 connected in a bridge configuration having two opposite input ends 64 for receiving the DC output voltage signal, and two other opposite output ends 66 for supplying the square voltage signal. Each of the four switch elements 62 has a gate for receiving a switch control signal at a controlled frequency determining the direct current signal supplied to the battery connect terminals 68. The inverter resonant circuit 60 and 84 also includes a resonant circuit 84 having an input for receiving the square voltage signal and an output for providing an alternating current signal.

Preferably, the second part further comprises a voltage detecting means 70 for detecting the DC output voltage signal and delivering a voltage signal indicative of the DC output voltage signal; and a controller 74 provided for controlling the four switch elements 62. The controller 74 includes the low pass filter 76, multiplying means 78 for multiplying the voltage signal delivered by the voltage detecting means 70 by the average current signal delivered by the low pass filter 76 and delivering a battery power signal indicative of a power supplied to the battery connect terminals 68.

Preferably, the controller 74 comprises a PI regulator 80 provided for comparing the battery power signal to a reference power signal provided by a power reference 81 and delivering a signal representative of a difference between the battery power signal and the reference power signal. A voltage control oscillator 82 is provided. It has an output for delivering the switch control signals at the controlled frequency as a function of the signal delivered by the PI regulator 80.

Preferably, the voltage detecting means 70 is a voltage divider having two resistors connected in series. The resonant circuit 84 comprises a capacitor and an inductor connected in series. The current rectifier 92 includes four diodes connected according to a diode bridge configuration having an output. The low pass filter 94 comprises a capacitor connected in parallel to output of the diode bridge configuration, and an inductance connected in series to the battery connect terminals 68.

Preferably, the controller 74 comprises a frequency limiter 96 having an input connected to the output of the oscillator 82, and an output for delivering the switch control signals at a frequency which is limited under a predetermined threshold value. A driver 98 which is a monostable driver is provided. It has an input connected to the output of the limiter 96, and outputs connected to the gates of the four controllable high frequency bidirectional switch elements 62.

Preferably, the apparatus further comprises a tertiary winding 100 of the impedance matching transformer 86, which is magnetically coupled to the second magnetic core part 112. The tertiary winding is for delivering a voltage signal indicative of a voltage at the battery connect terminals 68. The controller 74 further comprises a peak voltage detector 104 for detecting a peak voltage of a rectified signal delivered by the tertiary winding 100 via a bridge rectifier 102. The peak voltage detector 104 is for delivering a peak signal representative of the peak voltage of the signal delivered by the tertiary winding 100. A comparator 106 is provided for comparing the peak signal delivered by the peak voltage detector 104 to a predetermined threshold signal provided by a voltage reference 105, and delivering an output signal when the peak signal reaches the threshold signal. The output signal of the comparator 106 prevents operation of the oscillator 82.

Preferably, the controller 74 is for controlling the switch elements 62 as a function of the voltage signal delivered by the tertiary winding 100.

Figure 14B:
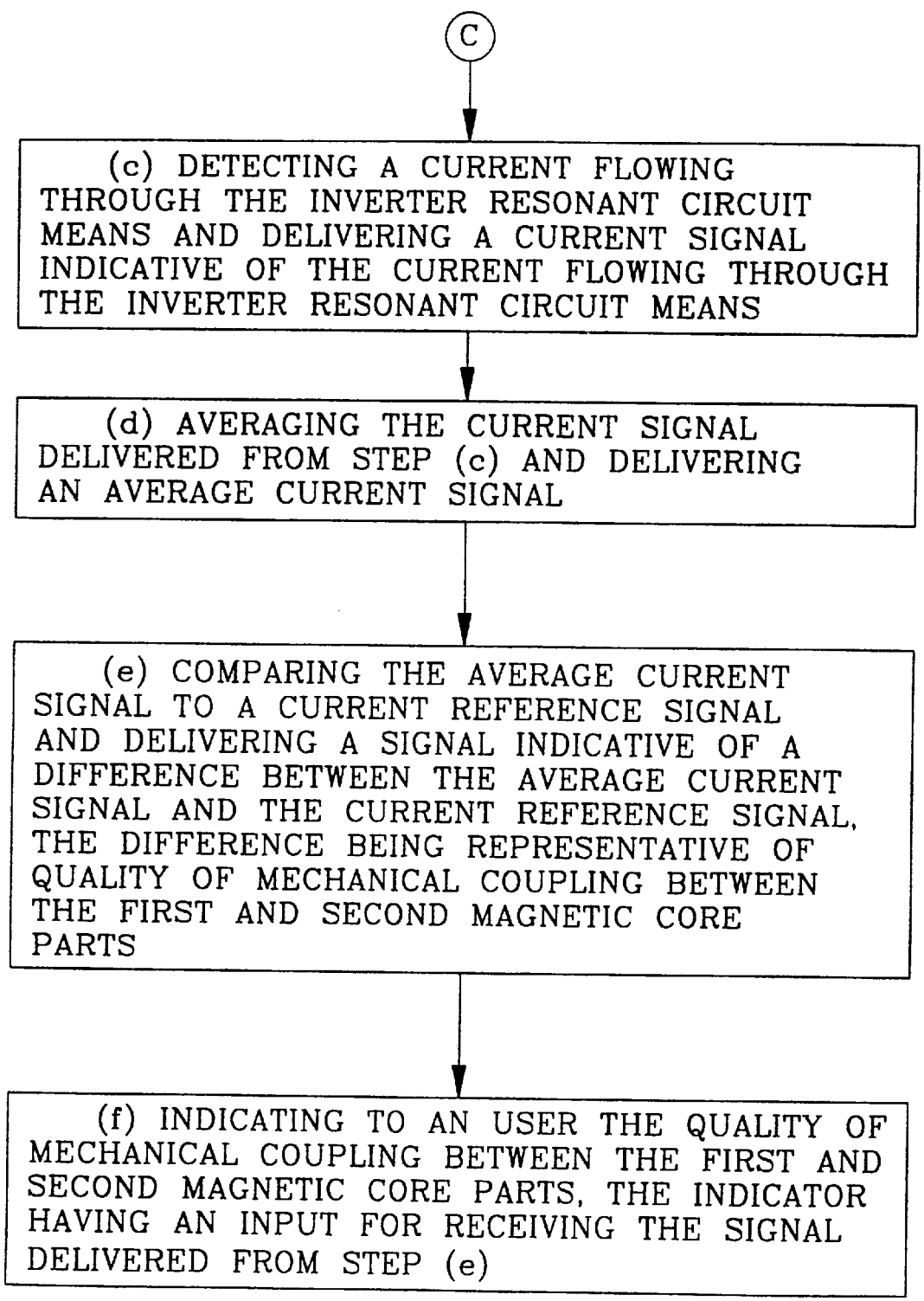

Referring now to FIG. 14, there is shown a method of operating a separable two-part battery charger for supplying a direct current signal to battery connect terminals. This method will be described in relation to the apparatus shown in FIG. 13 but the method should not be limited to this apparatus. The method comprises steps of:

(a) providing a first part which includes:
- a secondary winding 90 of an impedance matching transformer 86, having an output for delivering a transformed alternating current signal;
- a first magnetic core part 110 of the impedance matching transformer 86, which is magnetically coupled to the secondary winding 90;
- a current rectifier 92 for rectifying the transformed alternating current signal and delivering a rectified current signal; and
- a low pass filter 94 for low pass filtering the rectified current signal to supply the direct current signal to the battery connect terminals 68;

(b) providing a second part which includes:
- a voltage regulating means such as the one shown, for example, in FIG. 1 or 16 for producing a DC output voltage signal from an AC power supply signal;
- an inverter resonant circuit 60 and 84 for inverting the DC output voltage signal and delivering an alternating current signal;
- a primary winding 88 of the impedance matching transformer 86, having an input for receiving the alternating current signal; and
- a second magnetic core part 112 of the impedance matching transformer 86, which is magnetically coupled to the first primary winding 88, the second magnetic core part 112 being mechanically connectable to the first magnetic core part 110;

(c) detecting a current flowing through the inverter resonant circuit 60 and 84 and delivering a current signal indicative of the current flowing through the inverter resonant circuit 60 and 84;

(d) averaging the current signal delivered from step (c) and delivering an average current signal;

(e) comparing the average current signal to a current reference signal and delivering a signal indicative of a difference between the average current signal and the current reference signal, the difference being representative of quality of mechanical coupling between the first and second magnetic core parts 110 and 112; and (f) indicating to a user the quality of mechanical coupling between the first and second magnetic core parts 110 and 112, the indicating of step (f) being based on the signal delivered from step (e).

Preferably, in step (b), the inverter resonant circuit 60 and 84 comprises an inverter 60 for inverting the DC output voltage signal and delivering a square voltage signal. The inverter 60 includes four controllable high frequency bidirectional switch elements 62 connected in a bridge configuration having two opposite input ends 64 for receiving the DC output voltage signal, and two other opposite output ends 66 for supplying the square voltage signal. Each of the four switch elements 62 has a gate for receiving a switch control signal at a controlled frequency determining the direct current signal supplied to the battery connect terminals 68. The inverter resonant circuit 60 and 84 also comprises a resonant circuit 84 having an input for receiving the square voltage signal and an output for producing an alternating current signal.

The method further comprises steps of (g) detecting the DC output voltage signal to produce an average voltage signal indicative of the DC output voltage signal; (h) controlling the four switch elements 62 by means of the following steps (i) multiplying the average voltage signal delivered in step (g) by the average current signal delivered in step (d) and delivering a battery power signal indicative of a power supplied to the battery connect terminals 68; (ii) comparing the battery power signal to a reference power signal and delivering a signal representative of a difference between the battery power signal and the reference power signal; and (iii) delivering the switch control signals at the controlled frequency as a function of the signal delivered in step (ii).

Referring now to FIG. 15, there is shown another method of operating a separable two-part battery charger for supplying a direct current signal to battery connect terminals. This method will be described in relation to the apparatus shown in FIG. 13 but the method should not be limited to this apparatus. The method comprises steps of:

(a) providing a first part which includes:
  a secondary winding 90 of an impedance matching transformer 86, having an output for delivering a transformed alternating current signal;
  a first magnetic core part 110 of the impedance matching transformer 86, which is magnetically coupled to the secondary winding 90;
  a current rectifier 92 for rectifying the transformed alternating current signal and delivering a rectified current signal; and
  a low pass filter 94 for low pass filtering the rectified current signal to supply the direct current signal to the battery terminals 68;

(b) providing a second part which includes:
  a voltage regulating means such as, for example, the one shown in FIG. 1 or 16 for producing a DC output voltage signal from an AC power supply signal;
  an inverter resonant circuit 60 and 84 for inverting the DC output voltage signal and delivering an alternating current signal, the inverter resonant circuit 60 and 84 including controllable high frequency 10 bidirectional switch elements 62, each of the switch elements 62 having a gate for receiving a switch control signal at a controlled frequency determining the direct current signal supplied to the battery connect terminals 68;
  a primary winding 88 of the impedance matching transformer 86, having an input for receiving the alternating current signal;
  a second magnetic core part 112 of the impedance matching transformer 86, which is magnetically coupled to the first primary winding 88, the second magnetic core part 112 being mechanically connectable to the first magnetic core part 110;
  a tertiary winding 100 of the impedance matching transformer 86, which is magnetically coupled to the second magnetic core part 112, the tertiary winding 100 being for delivering a voltage signal indicative of a voltage at the battery connect terminals 68; and (c) controlling the switch elements 62 as a function of the voltage signal delivered by the tertiary winding 100.

Preferably, step (c) further comprises steps of (i) detecting a peak voltage of the signal delivered by the tertiary winding 100 and delivering a peak signal representative of the peak voltage of the signal delivered by the tertiary winding 100; and (ii) comparing the peak signal delivered from step (i) to a predetermined threshold signal, and delivering an output signal when the peak signal reaches the threshold signal, the output signal delivered from step (ii) preventing operation of the inverter resonant circuit 60 and 84.

Referring now to FIG. 16, there is shown a power factor correcting and voltage regulating apparatus. It comprises an apparatus input 2 for receiving an AC power supply signal having a frequency and a peak value; a low pass filter 4 for low pass filtering high-frequency current components out of the AC power supply signal received at the apparatus input 2; and a rectifier 120 for rectifying an AC signal delivered from the low pass filter 4. The rectifier 120 has an output for delivering a rectified voltage signal.

An inductor 8 is connected in series to the output of the rectifier 120. A modulating means which is a boost converter 122 is provided for modulating a current flowing through the inductor 8 to produce a modulated alternating current through the inductor 8 at a frequency higher than the one of the AC power supply signal and to produce a regulated voltage signal having a value equal or greater than the peak value of the AC power supply signal. The boost converter 122 includes a rectifying element 124 connected to a controllable high frequency switch 126. The controllable high frequency switch 126 has a gate for receiving a switch control signal.

A low pass filter 16 is provided for low pass filtering alternating voltage components out of the regulated voltage signal, and delivering the DC output voltage signal. A controller 24 is provided for controlling the controllable high frequency switch 126 to regulate the DC output voltage signal at a desired voltage signal by producing a discontinuous current through the inductor 8 at a frequency substantially higher than the frequency of the AC power supply signal. A voltage detector 20 is provided for detecting the DC output voltage signal and delivering an output signal indicative of the DC output voltage signal.

The controller 24 includes a PI controller 26 for comparing the output signal of the voltage detector 20 to a reference voltage signal provided by a voltage reference 27 and delivering a signal representative of a difference between the DC output voltage signal and the desired voltage signal. The controller 24 also includes a pulse width modulator 28 for producing the switch control signal as a function of the signal delivered by the PI controller 26.

Figure 17A:
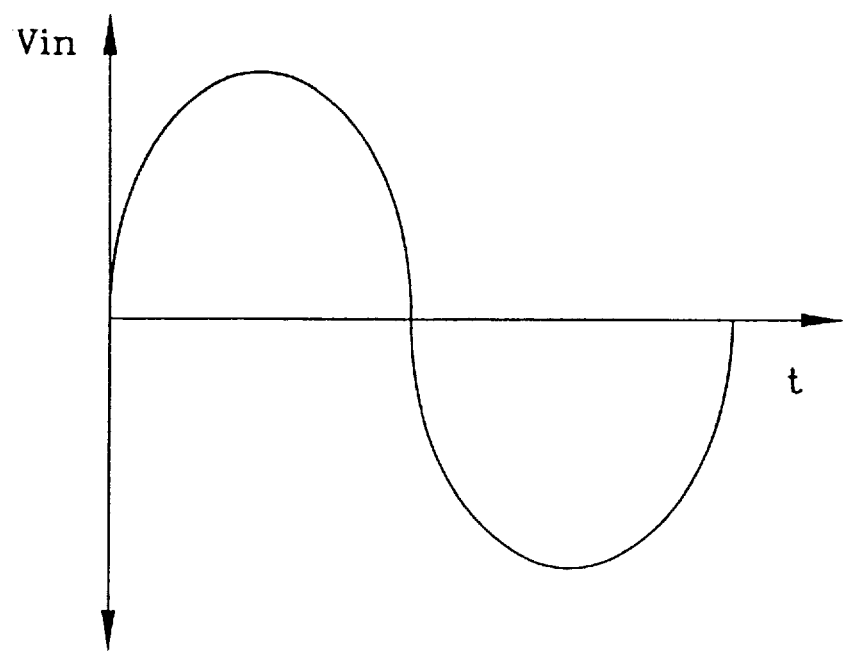
FIGS. 17a and 17b are diagrams showing signals present in the apparatus shown in FIG. 16 during operation thereof.
Figure 17B:
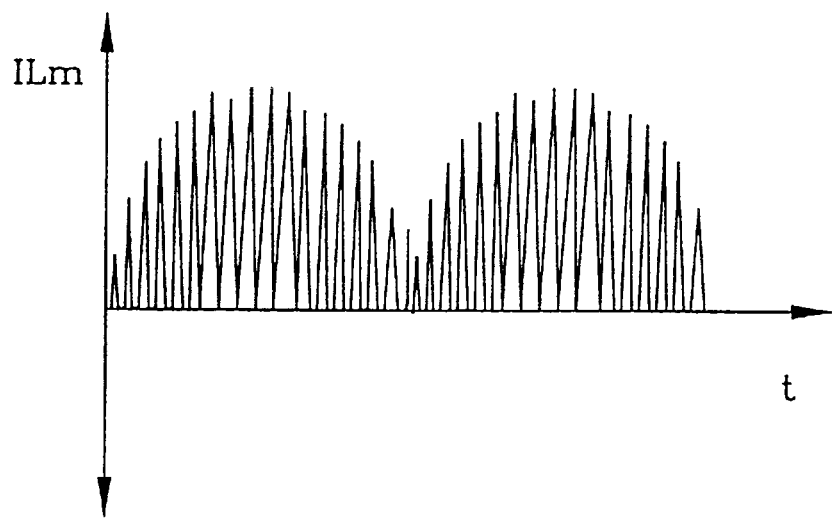

Referring now to FIG. 17, there are shown, in relation to FIG. 16, the voltage signal Vin and the current signal Ilm, with respect to time.

Referring now to FIG. 18, there is shown a power factor correcting and voltage regulating method. The method will be described in relation to the apparatus shown in FIG. 16 but the method should not be limited to this apparatus. The method comprises steps of:

(a) receiving by means of an apparatus input 2 an AC power supply signal having a frequency and a peak value;

(b) low pass filtering high-frequency current components out of the AC power supply signal received at the apparatus input 2;

(c) rectifying an AC signal delivered from step (b) to produce a rectified voltage signal at an output of a rectifying means 120;

(d) providing an inductor 8 connected in series to the output of the rectifying means 120;

(e) modulating a current flowing through the inductor 8 to produce a modulated alternating current through the inductor 8 at a frequency higher than the one of the AC power supply signal and to produce a regulated voltage signal having a value equal or greater than the peak value of the AC power supply signal by means of a boost converter 122 including a controllable high frequency switch 126 connected to a rectifying element 124, the controllable high frequency switch 126 having a gate for receiving a switch control signal;

(f) low pass filtering alternating voltage components out of the regulated voltage signal, and delivering a DC output voltage signal; and (g) controlling the controllable high frequency switch 126 to produce a discontinuous current through the inductor 8 at a frequency substantially higher than the frequency of the AC power supply signal to regulate the DC output voltage signal at a desired voltage signal, the step (g) further including steps of:

(i) detecting the DC output voltage signal delivered from step (f) and delivering an output signal indicative of the DC output voltage signal;

(ii) comparing the output signal delivered in step (i) to a reference voltage signal to produce a signal representative of a difference between the DC output voltage signal and the desired voltage signal; and (iii) producing the control signal by means of a pulse width modulator 28 as a function of the signal produced from step (ii).

Figure 19:
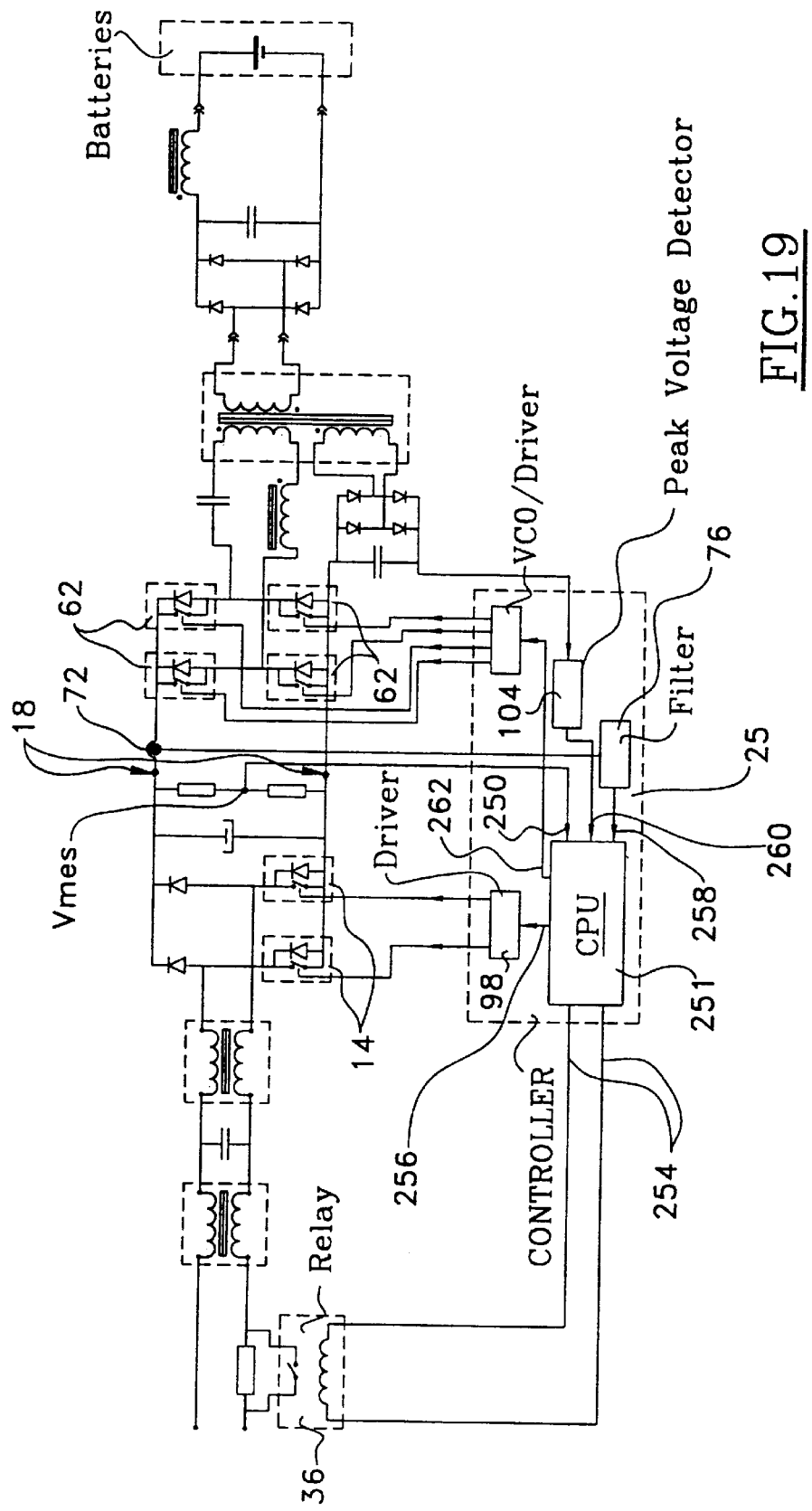
FIG. 19 is a circuit and block diagram of a battery charger according to the present invention.

Referring now to FIG. 19, there is shown the circuit of FIG. 1 combined with the circuit of FIG. 10. In FIG. 19, both circuits of FIGS. 1 and 10 are integrated with a single controller 25 which performs the functions of both controllers 24 and 74 shown respectively in FIGS. 1 and 10. Except for the controller 25, the other elements shown in FIG. 19 operate as the corresponding ones shown in FIGS. 1 and 10. Accordingly the description of these other elements will not be repeated.

Figure 20B:
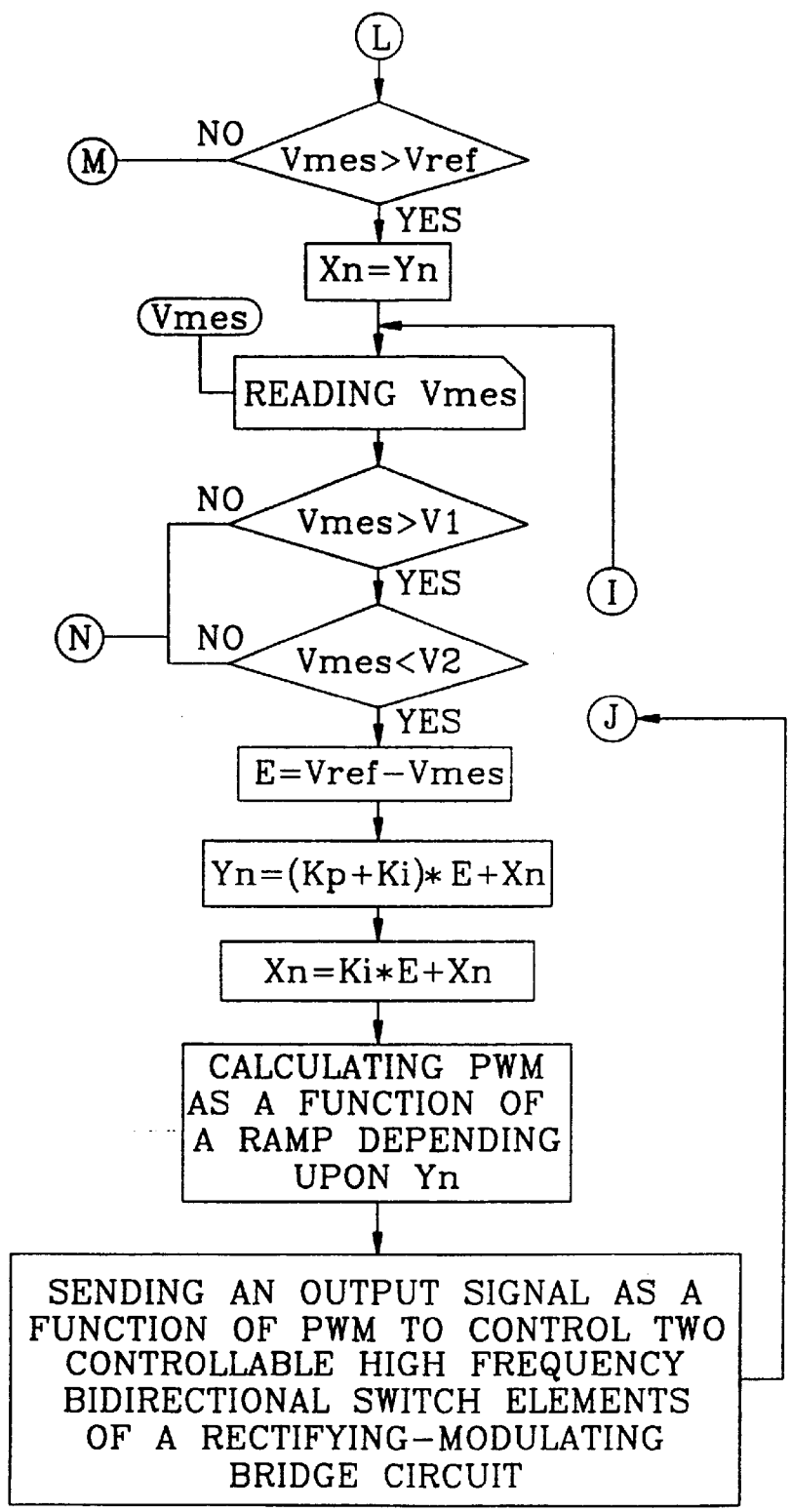
Figure 21:
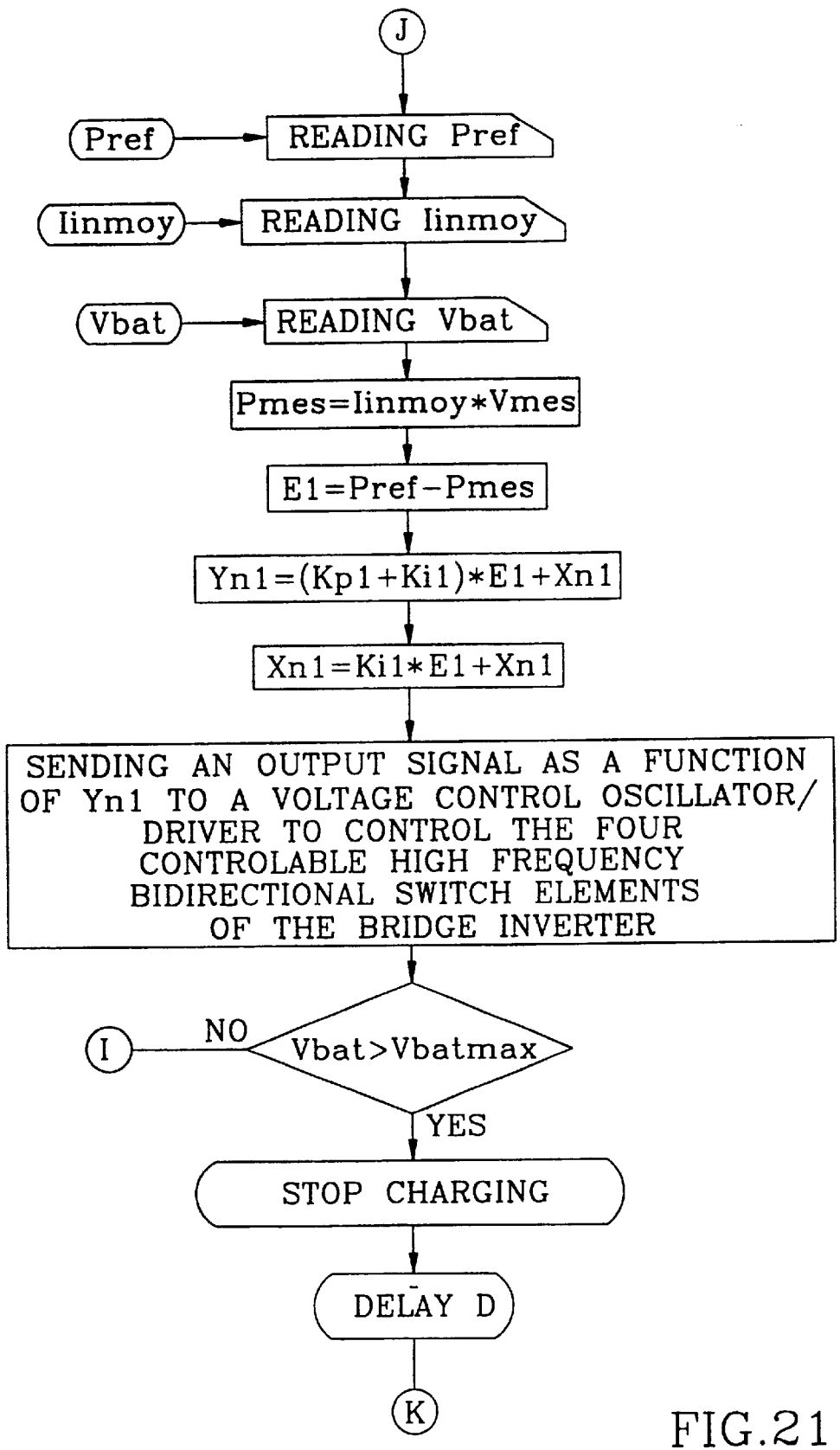

Referring now to FIGS. 20a and 20b and 21, there is shown a flow chart diagram of the operations performed by the CPU 251 shown in FIG. 19. We will now describe FIGS. 20 and 21 in relation to FIG. 19. Referring now more specifically to FIGS. 20a and 20b, the starting step consists in initializing variables Xn, Yn, Xnl, Ynl and PWM to zero values, and reading the value of Vref in an internal memory (not shown) of the CPU.

A standby cycle is started by reading the value of voltage Vmes at input 250 of the CPU 251. The value of Vmes is compared to a predetermined value V1. If Vmes is smaller than V1, the operation is looped in the standby cycle. If Vmes is not smaller than V1, it means that the output 18 needs to be regulated. In that case, the standby cycle is broken and a cycle (a) is started by sending a signal to outputs 254 for closing the relay 36.

Operation of cycle (a) continues by calculating the variable PWM as a function of a ramp depending on the value of variable Yn. The variable Yn is incremented. An output control signal is sent on output 256 via a driver 98 to control the two controllable high frequency bidirectional switch elements 14 of rectifier-modulator bridge 10. The signal sent on output 256 is a function of the variable PWM. The voltage value of Vmes is read again and compared to the value of Vref. If Vmes is not greater than Vref, the operation is looped in cycle (a). If Vmes is greater than Vref, then cycle (a) is broken, the value of the variable Xn is initialized to the value of the variable Yn and a cycle (b) is started.

Cycle (b) is started by a step of reading the value of Vmes and comparing it to V1 and V2 and if Vmes is greater than V1 and smaller than V2 then the variables E, Yn and Xn are calculated and an output signal is sent to output 256 via a driver 98 to control the switch elements 14. The signal sent on output 256 is a function of PWM which depends on the value of Yn. Cycle (b) is repeated as long as Vmes is greater than V1 and smaller than V2. When one of the latter conditions is not filled, cycle (b) is broken and the operation is brought back to the starting step.

In cycle (b), after the sending of an output signal on output 256 and before the looping on the step of reading the value of Vmes, additional steps are performed for controlling the switch elements 62 forming a bridge inverter. These additional are shown in FIG. 21.

FIG. 21 will be described in relation to FIG. 19. A variable Pref representing a power reference is read in an internal memory (not shown) of the CPU. A current value Iinmoy is read on input 258 of the CPU. A variable Vbat which is representative of the voltage at the terminals of the batteries is read on input 260 of the CPU. Then variables Pmes, El, Ynl and Xnl are calculated by the CPU. An output signal is sent on output 262 of the CPU 251 to a voltage control oscillator/driver to control the four controllable high frequency bidirectional switch elements 62 of the bridge inverter. Then Vbat is compared to a variable Vbatmax which is a variable stored in an internal memory of the CPU to verify whether the batteries are completely recharged. If Vbat is not greater than Vbatmax then the looping in cycle (b) continues. If Vbat is in fact greater than Vbatmax then the charging is stopped and the operation is brought back to the starting step.

Figure 22:
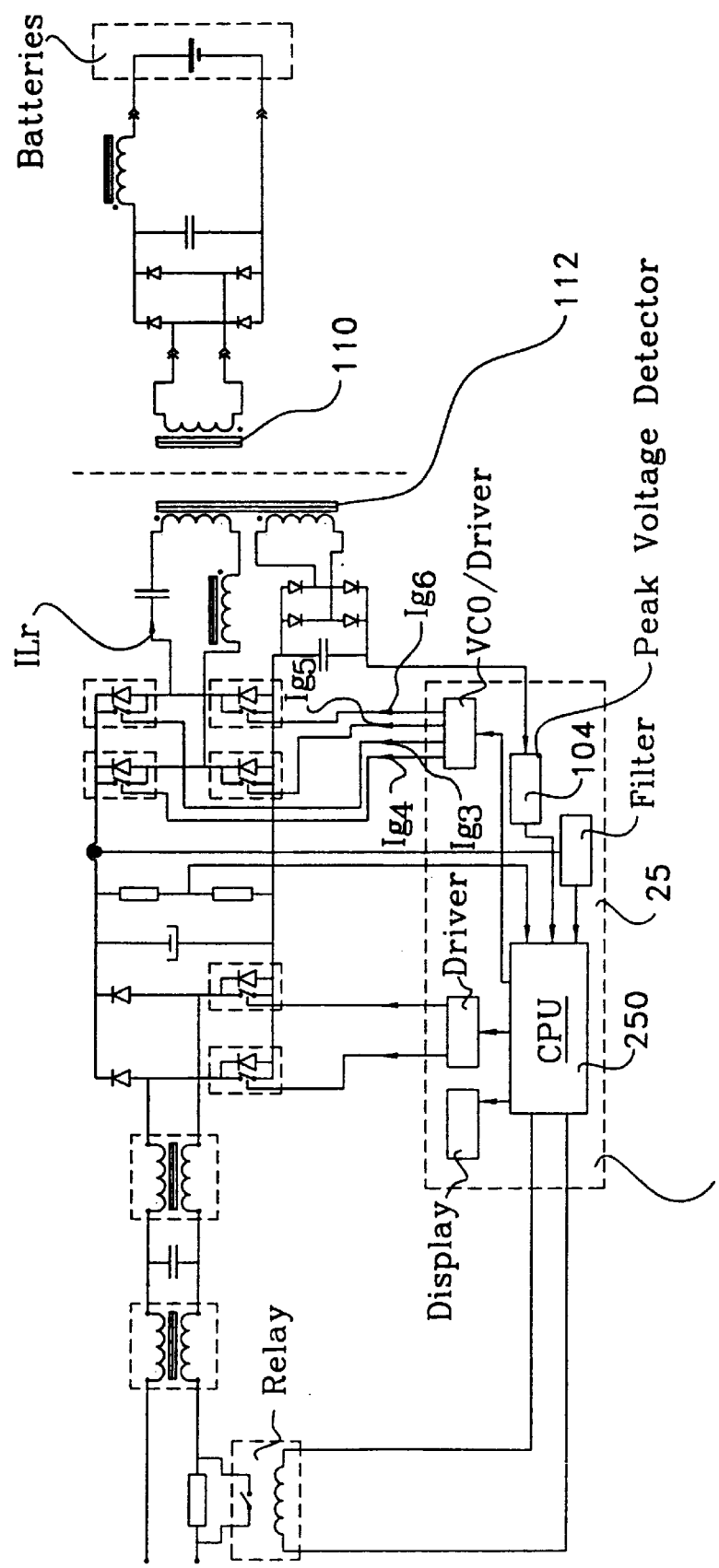
FIG. 22 is a circuit and block diagram of another battery charger according to the present invention.

Referring now to FIG. 22, there is shown the circuit of FIG. 1 combined with the circuit of FIG. 13. In FIG. 22, both circuits of FIGS. 1 and 13 are integrated with a single controller 25 which performs the functions of both controllers 24 and 74 shown respectively in FIGS. 1 and 13. Except for the controller 25, the other elements shown in FIG. 22 operate as the corresponding ones shown in FIGS. 1 and 13. Accordingly the description of these other elements will not be repeated.

Figure 23A:
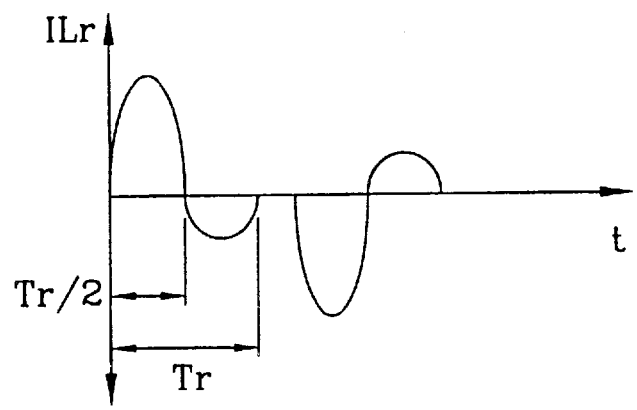
FIGS. 23a, 23b and 23c are diagrams showing signals present in the battery charger shown in FIG. 22 during operation thereof.
Figure 23B:
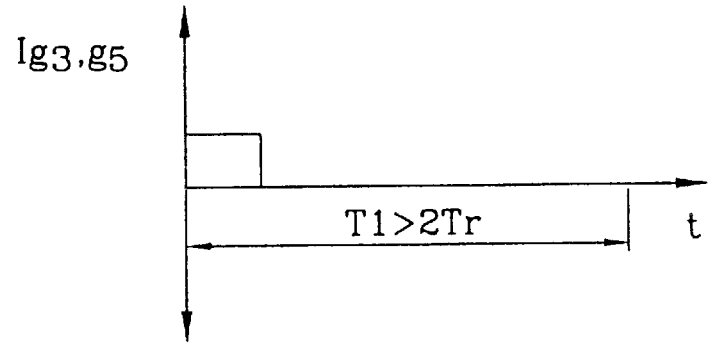
Figure 23C:
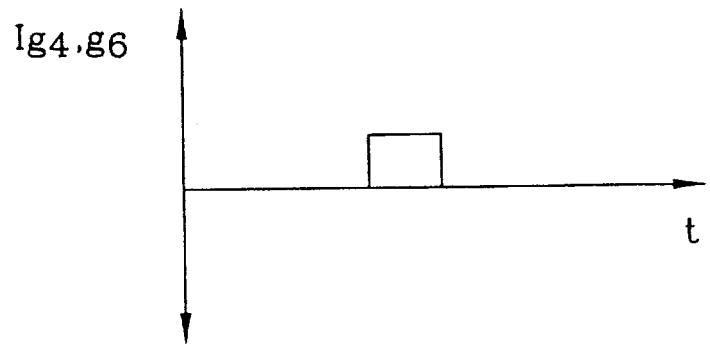

Referring now to FIGS. 23a, b and c, there are shown, in relation to FIG. 22, respectively the current signal Ilr, Ig3, g5 and Ig4, g6, with respect to time.

Figure 24:
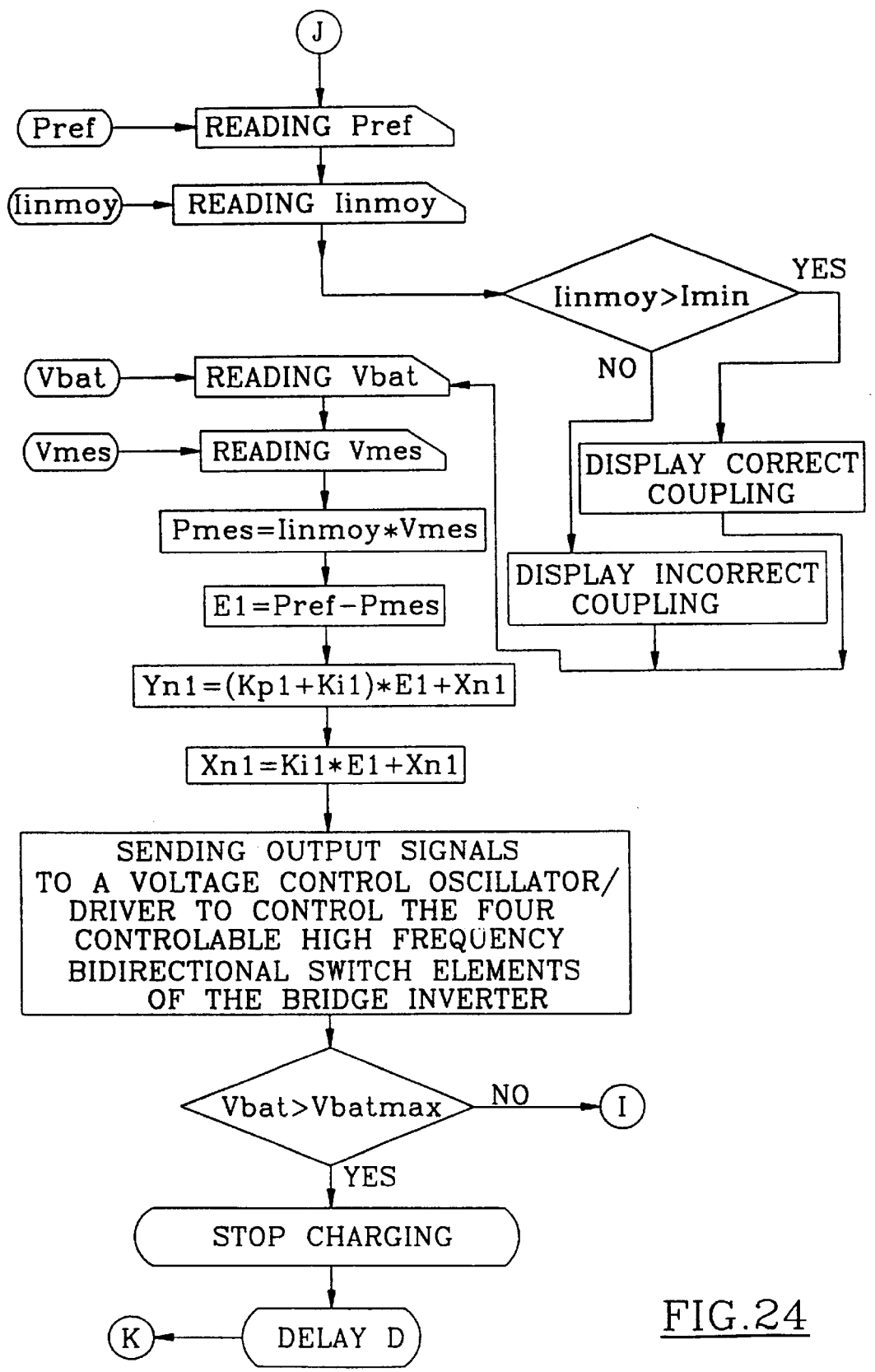
FIG. 24 is an algorithm performed by the controller shown in FIG. 22, which is an alternative algorithm to the one shown in FIG. 21.

Referring now to FIG. 24, there is shown a flow chart diagram of the operations perform by the CPU 251 shown in FIG. 22. We will now describe FIG. 24 in relation to FIG. 22. The flow chart diagram shown in FIG. 24 is similar to the one shown in FIG. 21 except for performing a test on Iinmoy and for displaying correct or incorrect coupling depending on the test. The description of FIG. 21 also applies to FIG. 24 consequently this description will not be repeated except for the test performed on Iinmoy. The variable Iinmoy is compared to a variable Imin stored in an internal memory of the CPU. If Iinmoy is greater than Imin this means that the coupling of the magnetic core parts 110 and 112 is correct. In this case a display indicating that the coupling is correct is activated. If the result of the test is negative, a display indicating that the coupling is incorrect is activated.

Although the present invention has been explained hereinafter by way of preferred embodiments thereof, it should be pointed out that any modifications to these preferred embodiments, within the scope of the appended claims, are not deemed to change or alter the nature and scope of the present invention.

What is claimed is:

1. A separable two-part battery charger for supplying a direct current signal to battery connect terminals, comprising a first part and a second part, wherein:

the first part includes:
- a secondary winding of an impedance matching transformer, having an output for delivering a transformed alternating current signal;
- a first magnetic core part of the impedance matching transformer, which is magnetically coupled to the secondary winding;
- a current rectifier for rectifying the transformed alternating current signal and delivering a rectified current signal; and
- a low pass filter means for low pass filtering the rectified current signal to supply the direct current signal to the battery connect terminals; and the second part includes:
- a power supply means for producing a DC output voltage signal;
- an inverter resonant circuit means for inverting the DC output voltage signal and delivering an alternating current signal;
- a primary winding of the impedance matching transformer, having an input for receiving the alternating current signal;
- a second magnetic core part of the impedance matching transformer, which is magnetically coupled to the first primary winding, the second magnetic core part being mechanically connectable to the first magnetic core part;
- a current detector for detecting a current flowing through the inverter resonant circuit means and delivering a current signal indicative of the current flowing through the inverter resonant circuit means;
- a current averaging means for averaging the current signal delivered by the current detector and delivering an average current signal;
- a comparing means for comparing the average current signal to a current reference signal and delivering a signal indicative of a difference between the average current signal and the current reference signal, the difference being representative of quality of mechanical coupling between the first and second magnetic core parts; and
- an indicator for indicating to a user the quality of mechanical coupling between the first and second magnetic core parts, the indicator having an input for receiving the signal delivered from the comparing means.

2. A charger according to claim 1, wherein:

the power supply means is a voltage regulating means for producing the DC output voltage signal from an AC power supply signal;

the inverter resonant circuit means comprises:
- an inverter means for inverting the DC output voltage signal and delivering a square voltage signal, the inverter means including four controllable high frequency bidirectional switch elements connected in a bridge configuration having two opposite input ends for receiving the DC output voltage signal, and two other opposite output ends for supplying the square voltage signal, each of the four switch elements having a gate for receiving a switch control signal at a controlled frequency determining the direct current signal supplied to the battery connect terminals; and
- a resonant circuit having an input for receiving the square voltage signal and an output for delivering the alternating current signal;

the charger further comprising:
- a voltage detecting means for detecting the DC output voltage signal and delivering a voltage signal indicative of the DC output voltage signal;
- a controlling means for controlling the four switch elements, the controlling means including:
  - the current averaging means;
  - multiplying means for multiplying the voltage signal delivered by the voltage detecting means by the average current signal delivered by the current averaging means and delivering a battery power signal indicative of a power supplied to the battery connect terminals;
  - a regulating means for comparing the battery power signal to a reference power signal and delivering a value representative of a difference between the battery power signal and the reference power signal; and
  - an oscillator having an output for delivering the switch control signals at the controlled frequency as a function of the value delivered by the regulating means.

3. A charger according to claim 2, wherein the voltage detecting means is a voltage divider having two resistors connected in series.

4. A charger according to claim 2, wherein the resonant circuit comprises a capacitor and an inductor connected in series.

5. A charger according to claim 2, wherein:

the current rectifier includes four diodes connected according to a diode bridge configuration having an output; and the low pass filter means comprises a capacitor connected in parallel to the output of the diode bridge configuration, and an inductance connected in series to the battery connect terminals.

6. A charger according to claim 2, wherein the controlling means further comprises:
- a frequency limiter having an input connected to the output of the oscillator, and an output for delivering the switch control signals at the controlled frequency which is limited under a predetermined threshold value; and
- a driver having an input connected to the output of the limiter, and outputs connected to the gates of the four controllable high frequency bidirectional switch elements.

7. An apparatus according to claim 2, further comprising a tertiary winding of the impedance matching transformer, which is magnetically coupled to the primary and secondary windings, the tertiary winding being for delivering a voltage signal indicative of a voltage at the battery connect terminals; and wherein the controlling means further comprises:

a peak voltage detector for detecting a peak voltage of the signal delivered by the tertiary winding and delivering a peak signal representative of the peak voltage of the signal delivered by the tertiary winding;

comparing means for comparing the peak signal delivered by the peak voltage detector to a predetermined threshold signal, and delivering an output signal when the peak signal reaches the threshold signal, the output signal of the comparing means preventing operation of the oscillator.

8. An apparatus according to claim 1, wherein the power supply means is a voltage regulating means comprising:

an apparatus input for receiving an AC power supply signal having a frequency and a peak value;

a first low pass filter having an input connected to the apparatus input for low pass filtering high-frequency current components out of the AC power supply signal received at the apparatus input, the low pass filter having also an output;

an inductor connected to the output of the low pass filter;

a rectifying-modulating bridge circuit means for modulating an alternating current flowing through the inductor at a frequency higher than the one of the AC power supply signal, rectifying this alternating current, and delivering a regulated voltage signal having a value equal or greater than the peak value of the AC power supply signal, the bridge circuit means including two rectifying elements connected respectively to two controllable high frequency bidirectional switch elements to form a pair of boost converters, each of the switch elements having a gate for receiving a switch control signal;

a second low pass filter for filtering alternating voltage components out of the regulated voltage signal, the second low pass filter having an output for delivering the DC output voltage signal; and voltage detecting means for detecting the DC output voltage signal, the voltage detecting means having an output for delivering an output signal indicative of a value of the DC output voltage signal; and a controlling means for controlling the switch elements to regulate the DC output voltage signal at a desired voltage signal by producing a discontinuous current through the inductor at a frequency substantially higher than the frequency of the AC power supply signal, the controlling means including:

a comparator for comparing the output signal of the voltage detecting means to a reference voltage signal and delivering a signal representative of a difference between the DC output voltage signal and the desired voltage signal; and a pulse width modulator for producing the switch control signals as a function of the signal delivered by the comparator means.

9. An apparatus according to claim 1, wherein:

the inverter resonant circuit means includes controllable high frequency bidirectional switch elements, each of the switch elements having a gate for receiving a switch control signal at a controlled frequency determining the direct current signal supplied to the battery connect terminals;

the second part includes:

a tertiary winding of the impedance matching transformer, which is magnetically coupled to the second magnetic core part, the tertiary winding being for delivering a voltage signal indicative of a voltage at the battery connect terminals; and a controller for controlling the switch elements as a function of the voltage signal delivered by the tertiary winding.

10. An apparatus according to claim 1, wherein the power supply means is a voltage regulating means comprising:

an apparatus input for receiving an AC power supply signal having a frequency and a peak value;

a first low pass filter for low pass filtering high-frequency current components out of the AC power supply signal received at the apparatus input;

rectifying means for rectifying an AC signal delivered from the first low pass filter, the rectifying means having an output for delivering a rectified voltage signal;

an inductor connected in series to the output of the rectifying means;

modulating means for modulating a current flowing through the inductor to produce a modulated alternating current through the inductor at a frequency higher than the one of the AC power supply signal and to produce a regulated voltage signal having a value equal or greater than the peak value of the AC power supply signal, the modulating means including a rectifying element connected to a controllable high frequency switch means to form a boost converter, the controllable high frequency switch means having a gate for receiving a switch control signal;

a second low pass filter for filtering alternating voltage components out of the regulated voltage signal, and delivering the DC output voltage signal; and a voltage detecting means for detecting the DC output voltage signal and delivering an output signal indicative of the DC output voltage signal;

controlling means for controlling the controllable high frequency switch means to regulate the DC output voltage signal at a desired voltage signal by producing a discontinuous current through the inductor at a frequency substantially higher than the frequency of the AC power supply signal, the controlling means including:

a comparator for comparing the output signal of the voltage detecting means to a reference voltage signal and delivering a signal representative of a difference between the DC output voltage signal and the desired voltage signal; and a pulse width modulator for producing the at least one control signal as a function of the signal delivered by the comparator.

11. A battery charger for supplying a direct current signal to battery connect terminals, comprising:

a power supply means for producing a DC output voltage signal;

an inverter means for inverting the DC output voltage signal and delivering a square voltage signal, the inverter means including four controllable high frequency bidirectional switch elements connected in a bridge configuration having two opposite input ends for receiving the DC output voltage signal, and two other opposite output ends for supplying the square voltage signal, each of the four switch elements having a gate for receiving a switch control signal at a controlled frequency determining the direct current signal supplied to the battery connect terminals;

a voltage detecting means for detecting the DC output voltage signal and delivering a voltage signal indicative of the DC output voltage signal;

a current detector for detecting a current signal at the input ends of the bridge configuration and delivering a signal indicative of the current signal;

a controlling means for controlling the four switch elements, the controlling means including:
    a current averaging means for averaging the signal delivered by the current detector and delivering an average current signal indicative of an average value of the current signal;
    multiplying means for multiplying the voltage signal delivered by the voltage detecting means by the average current signal delivered by the current averaging means and delivering a battery power signal indicative of a power supplied to the battery connect terminals;
    a regulating means for comparing the battery power signal to a reference power signal and delivering a signal representative of a difference between the battery power signal and the reference power signal; and
    an oscillator having an output for delivering the switch control signals at the controlled frequency as a function of the signal delivered by the regulating means;

a resonant circuit having an input for receiving the square voltage signal and an output for producing an alternating current signal;

an impedance matching transformer having a primary winding for receiving the alternating current signal, and a secondary winding for delivering a transformed alternating current signal;

a current rectifier for rectifying the transformed alternating current signal and delivering a rectified current signal; and a low pass filter means for low pass filtering the rectified current signal and delivering the direct current signal supplied to the battery connect terminals.

12. A charger according to claim 11, wherein the voltage detecting means is a voltage divider having two resistors connected in series.

13. A charger according to claim 11, wherein the resonant circuit comprises a capacitor and an inductor connected in series.

14. A charger according to claim 11, wherein:
    the current rectifier includes four diodes connected according to a diode bridge configuration having an output; and
    the low pass filter means comprises a capacitor connected in parallel to the output of the diode bridge configuration, and an inductance connected in series to the battery connect terminals.

15. A charger according to claim 11, wherein the controlling means comprises:
    a frequency limiter having an input connected to the output of the oscillator, and an output for delivering the switch control signals at a frequency which is limited under a predetermined threshold value; and
    a driver having an input connected to the output of the limiter, and outputs connected to the gates of the four controllable high frequency bidirectional switch elements.

16. An apparatus according to claim 11, wherein the power supply means is a voltage regulating means for producing the DC output voltage signal from an AC power supply signal, and the voltage regulating means comprises:
    an apparatus input for receiving the AC power supply signal having a frequency and a peak value;
    a first low pass filter having an input connected to the apparatus input for low pass filtering high-frequency current components out of the AC power supply signal received at the apparatus input, the low pass filter having also an output;
    an inductor connected to the output of the low pass filter;
    a rectifying-modulating bridge circuit means for modulating an alternating current flowing through the inductor at a frequency higher than the one of the AC power supply signal, rectifying this alternating current, and delivering a regulated voltage signal having a value equal or greater than the peak value of the AC power supply signal, the bridge circuit means including two rectifying elements connected respectively to two controllable high frequency bidirectional switch elements to form a pair of boost converters, each of the switch elements having a gate for receiving a switch control signal;
    a second low pass filter for low pass filtering alternating voltage components out of the regulated voltage signal, the second low pass filter having an output for delivering the DC output voltage signal; and
    a voltage detector for detecting the DC output voltage signal, the voltage detector having an output for delivering an output signal indicative of the DC output voltage signal; and
    a controller for controlling the switch elements to regulate the DC output voltage signal at a desired voltage signal by producing a discontinuous current through the inductor at a frequency substantially higher than the frequency of the AC power supply signal, the controller including:
        a comparing means for comparing the output signal of the voltage detector to a reference voltage signal and delivering a signal representative of a difference between the DC output voltage signal and the desired voltage signal; and
        a pulse width modulator for producing the switch control signals as a function of the signal delivered by the comparing means.

17. An apparatus according to claim 11, comprising a first part and a second part, wherein:
the first part includes:
    the secondary winding of the impedance matching transformer;
    a first magnetic core part of the impedance matching transformer, which is magnetically coupled to the secondary winding;
    the current rectifier; and
    the low pass filter means; and
the second part includes:
    the power supply means;
    the inverter means;

the voltage detecting means;

the current detector;

the controlling means;

the resonant circuit;

the primary winding of the impedance matching transformer;

a second magnetic core part of the impedance matching transformer, which is magnetically coupled to the first primary winding, the second magnetic core part being mechanically connectable to the first magnetic core part;

a comparing means for comparing the average current signal to a current reference signal and delivering a signal indicative of a difference between the average current signal and the current reference signal, the difference being representative of quality of mechanical coupling between the first and second magnetic core parts; and an indicator for indicating to a user the quality of mechanical coupling between the first and second magnetic core parts, the indicator having an input for receiving the signal delivered from the comparing means.

18. An apparatus according to claim 11, comprising a first part and a second part, wherein:

the first part includes:

the secondary winding of the impedance matching transformer;

a first magnetic core part of the impedance matching transformer, which is magnetically coupled to the secondary winding;

the current rectifier; and a low pass filter means; and the second part includes:

the power supply means;

the inverter means;

the voltage detecting means;

the current detector;

the controlling means;

the resonant circuit;

the primary winding of the impedance matching transformer;

a second magnetic core part of the impedance matching transformer, which is magnetically coupled to the first primary winding, the second magnetic core part being mechanically connectable to the first magnetic core part;

a tertiary winding of the impedance matching transformer, which is magnetically coupled to the second magnetic core part, the tertiary winding being for delivering a voltage signal indicative of a voltage at the battery connect terminals; and a controller for controlling the switch elements as a function of the voltage signal delivered by the tertiary winding.

19. An apparatus according to claim 11, wherein the power supply means is a voltage regulating means comprising:

an apparatus input for receiving an AC power supply signal having a frequency and a peak value;

a first low pass filter for low pass filtering high-frequency current components out of the AC power supply signal received at the apparatus input;

rectifying means for rectifying an AC signal delivered from the first low pass filter, the rectifying means having an output for delivering a rectified voltage signal;

an inductor connected in series to the output of the rectifying means;

modulating means for modulating a current flowing through the inductor to produce a modulated alternating current through the inductor at a frequency higher than the one of the AC power supply signal and to produce a regulated voltage signal having a value equal or greater than the peak value of the AC power supply signal, the modulating means including a rectifying element connected to a controllable high frequency switch means to form a boost converter, the controllable high frequency switch means having a gate for receiving a switch control signal;

a second low pass filter for low pass filtering alternating voltage components out of the regulated voltage signal, and delivering the DC output voltage signal;

a voltage detector for detecting the DC output voltage signal and delivering an output signal indicative of the DC output voltage signal; and a controller for controlling the controllable high frequency switch means to regulate the DC output voltage signal at a desired voltage signal by producing a discontinuous current through the inductor at a frequency substantially higher than the frequency of the AC power supply signal, the controller including:

a comparing means for comparing the output signal of the voltage detector to a reference voltage signal and delivering a signal representative of a difference between the DC output voltage signal and the desired voltage signal; and a pulse width modulator for producing the switch control signal as a function of the signal delivered by the comparing means.

20. A method for supplying a direct current signal to battery connect terminals, comprising steps of:

(a) supplying a DC output voltage signal;

(b) inverting the DC output voltage signal to produce a square voltage signal by means of an inverter means including four controllable high frequency bidirectional switch elements connected in a bridge configuration having two opposite input ends for receiving the DC output voltage signal, and two other opposite output ends for supplying the square voltage signal, each of the four switch elements having a gate for receiving a switch control signal at a controlled frequency determining the direct current signal supplied to the battery connect terminals;

(c) detecting the DC output voltage signal to produce an average voltage signal indicative of the DC output voltage signal;

(d) detecting a current signal at the input ends of the bridge configuration to produce an average current signal indicative of an average value of the current signal;

(e) controlling the four switch elements by means of the following steps:

(i) multiplying the average voltage signal by the average current signal to produce a battery power signal indicative of a power supplied to the battery connect terminals;

(ii) comparing the battery power signal, to a reference power signal to produce a signal representative of a difference between the battery power signal and the reference power signal; and (iii) producing the switch control signals at the controlled frequency as a function of the signal produced in step (ii);

(f) applying the square voltage signal to an input of a resonant circuit to produce at its output an alternating current signal;

(g) applying the alternating current signal to a primary winding of an impedance matching transformer to deliver at its secondary winding a transformed alternating current signal;

(h) rectifying the transformed alternating current signal to produce a rectified current signal; and (j) low pass filtering the rectified current signal to produce the direct current signal supplied to the battery connect terminals.

21. A method according to claim 20, wherein step (e) further comprises step of (iv) limiting the controlled frequency of the switch control signals under a predetermined threshold value.

22. A method according to claim 20, wherein the step (a) is a step of regulating an AC power supply signal to produce the DC output voltage signal and comprises steps of:

(A) receiving by means of an apparatus input the AC power supply signal having a frequency and a peak value;

(B) low pass filtering high-frequency current components out of the AC power supply signal received at the apparatus input by means of a low pass filter means having an input connected to the apparatus input, and an output;

(C) providing an inductor connected to the output of the low pass filter means;

(D) modulating an alternating current flowing through the inductor at a frequency higher than the one one of the AC power supply signal, and rectifying this alternating current to deliver a regulated voltage signal having a value equal or greater than the peak value of the AC power supply signal by means of a rectifying-modulating bridge circuit means, the bridge circuit means including two rectifying elements connected respectively to two controllable high frequency bidirectional switch elements to form a pair of boost converters, each of the switch elements having a gate for receiving a switch control signal;

(E) low pass filtering alternating voltage components out of the regulated voltage signal, and delivering the DC output voltage signal; and (F) controlling the switch elements to produce a discontinuous current through the inductor at a frequency substantially higher than the frequency of the AC power supply signal to regulate the DC output voltage signal at a desired voltage signal, the step (F) further including steps of:

(I) detecting the DC output voltage signal delivered from step (E), and delivering an output signal indicative of the DC output voltage signal;

(II) comparing the output signal delivered in step (I) to a reference voltage signal to produce a signal representative of a difference between the DC output voltage signal and the desired voltage signal; and (III) producing the switch control signals by means of a pulse width modulator as a function of the signal produced from step (II).

23. A method according to claim 20, further comprises the steps of:

(A) providing a first part which includes:
the secondary winding of the impedance matching transformer;
a first magnetic core part of the impedance matching transformer, which is magnetically coupled to the secondary winding;
a current rectifier for performing step (h); and
a low pass filter means for performing step (j);

(B) providing a second part which includes:
a voltage regulating means for performing step (a);
an inverter resonant circuit means for performing steps (b) to (f);
the primary winding of the impedance matching transformer;
a second magnetic core part of the impedance matching transformer, which is magnetically coupled to the first primary winding, the second magnetic core part being mechanically connectable to the first magnetic core part;

(C) detecting a current flowing through the inverter resonant circuit means and delivering a current signal indicative of the current flowing through the inverter resonant circuit means;

(D) averaging the current signal delivered from step (C) and delivering an average current signal;

(E) comparing the average current signal to a current reference signal and delivering a signal indicative of a difference between the average current signal and the current reference signal, the difference being representative of quality of mechanical coupling between the first and second magnetic core parts; and (F) indicating to a user the quality of mechanical coupling between the first and second magnetic core parts, based on the signal delivered from step (E).

24. A method according to claim 20, further comprising steps of:

(A) providing a first part which includes:
the secondary winding of the impedance matching transformer;
a first magnetic core part of the impedance matching transformer, which is magnetically coupled to the secondary winding;
a current rectifier for performing step (h); and
a low pass filter means for performing step (j);

(B) providing a second part which includes:
a voltage regulating means for performing step (a);
the inverter means;
a voltage detecting means for performing step (c);
a current detector for performing step (d);
a controlling means for performing step (e);
the resonant circuit;
the primary winding of the impedance matching transformer;
a second magnetic core part of the impedance matching transformer, which is magnetically coupled to the first primary winding, the second magnetic core part being mechanically connectable to the first magnetic core part;
a tertiary winding of the impedance matching transformer, which is magnetically coupled to the second magnetic core part, the tertiary winding being for delivering a voltage signal indicative of a voltage at the battery connect terminals; and (C) controlling the switch elements as a function of the voltage signal.

25. A method according to claim 20, wherein step (a) comprises steps of:
- (A) receiving by means of an apparatus input the AC power supply signal having a frequency and a peak value;
- (B) low pass filtering high-frequency current components out of the AC power supply signal received at the apparatus input;
- (C) rectifying an AC signal delivered from step (B) to produce a rectified voltage signal at an output of a rectifying means;
- (D) providing an inductor connected in series to the output of the rectifying means;
- (E) modulating a current flowing through the inductor to produce a modulated alternating current through the inductor at a frequency higher than the one of the AC power supply signal and to produce a regulated voltage signal having a value equal or greater than the peak value of the AC power supply signal by means of a modulating means including a controllable high frequency switch means connected to a rectifying element to form a boost converter, the controllable high frequency switch means having a gate for receiving a switch control signal;
- (F) low pass filtering alternating voltage components out of the regulated voltage signal, and delivering the DC output voltage signal; and
- (G) controlling the controllable high frequency switch means to produce a discontinuous current through the inductor at a frequency substantially higher than the frequency of the AC power supply signal to regulate the DC output voltage signal at a desired voltage signal, the step (G) further including steps of:
  - (I) detecting the DC output voltage signal delivered from step (F) and delivering an output signal indicative of the DC output voltage signal;
  - (II) comparing the output signal delivered in step (I) to a reference voltage signal to produce a signal representative of a difference between the DC output voltage signal and the desired voltage signal; and
  - (III) producing the switch control signal by means of a pulse width modulator as a function of the signal produced from step (II).

26. Method of operating a separable two-part battery charger for supplying a direct current signal to battery connect terminals, comprising steps of:
- (a) providing a first part which includes:
  - a secondary winding of an impedance matching transformer, having an output for delivering a transformed alternating current signal;
  - a first magnetic core part of the impedance matching transformer, which is magnetically coupled to the secondary winding;
  - a current rectifier for rectifying the transformed alternating current signal and delivering a rectified current signal; and
  - a low pass filter means for low pass filtering the rectified current signal to supply the direct current signal to the battery connect terminals;
- (b) providing a second part which includes:
  - a power supply means for producing a DC output voltage signal;
  - an inverter resonant circuit means for inverting the DC output voltage signal and delivering an alternating current signal;
  - a primary winding of the impedance matching transformer, having an input for receiving the alternating current signal;
  - a second magnetic core part of the impedance matching transformer, which is magnetically coupled to the first primary winding, the second magnetic core part being mechanically connectable to the first magnetic core part;
- (c) detecting a current flowing through the inverter resonant circuit means and delivering a current signal indicative of the current flowing through the inverter resonant circuit means;
- (d) averaging the current signal delivered from step (c) and delivering an average current signal;
- (e) comparing the average current signal to a current reference signal and delivering a signal indicative of a difference between the average current signal and the current reference signal, the difference being representative of quality of mechanical coupling between the first and second magnetic core parts; and
- (f) indicating to a user the quality of mechanical coupling between the first and second magnetic core parts, the indicating of step (f) being based on the signal delivered from step (e).

27. A method according to claim 26, wherein:
in step (b), the power supply means is a voltage regulating means for producing the DC output voltage signal from an AC power supply signal and the inverter resonant circuit means comprises:
- an inverter means for inverting the DC output voltage signal and delivering a square voltage signal, the inverter means including four controllable high frequency bidirectional switch elements connected in a bridge configuration having two opposite input ends for receiving the DC output voltage signal, and two other opposite output ends for supplying the square voltage signal, each of the four switch elements having a gate for receiving a switch control signal at a controlled frequency determining the direct current signal supplied to the battery connect terminals; and
- a resonant circuit having an input for receiving the square voltage signal and an output for producing the alternating current signal;

the method further comprising steps of:
- (g) detecting the DC output voltage signal and delivering an average voltage signal indicative of the DC output voltage signal;
- (h) controlling the four switch elements by means of the following steps:
  - (i) multiplying the average voltage signal delivered in step (g) by the average current signal delivered in step (d) and delivering a battery power signal indicative of a power supplied to the battery connect terminals;
  - (ii) comparing the battery power signal to a reference power signal and delivering a value representative of a difference between the battery power signal and the reference power signal; and
  - (iii) delivering the switch control signals at the controlled frequency as a function of the value delivered in step (ii).

28. A method according to claim 27, further comprising steps of:
- (j) providing a tertiary winding of the impedance matching transformer, which is magnetically coupled to the primary and secondary windings, the tertiary winding being for delivering a voltage signal indicative of a voltage at the battery connect terminals; and
wherein step (h) further comprises steps of:

(iv) detecting a peak voltage of the signal delivered by the tertiary winding and delivering a peak signal representative of the peak voltage of the signal delivered by the tertiary winding; and (v) comparing the peak signal delivered in step (iv) to a predetermined threshold signal, and delivering an output signal when the peak signal reaches the threshold signal, the output signal delivered in step (v) preventing the delivering of step (iii).

29. A method according to claim 26, wherein, in step (b), the power supply means is a voltage regulating means performing the steps of:

(A) receiving by means of an apparatus input an AC power supply signal having a frequency and a peak value;

(B) low pass filtering high-frequency current components out of the AC power supply signal received at the apparatus input by means of a low pass filter having an input connected to the apparatus input, and an output;

(C) providing an inductor connected to the output of the low pass filter;

(D) modulating an alternating current flowing through the inductor at a frequency higher than the one of the AC power supply signal, and rectifying this alternating current to deliver a regulated voltage signal having a value equal or greater than the peak value of the AC power supply signal by means of a rectifying-modulating bridge circuit means, the bridge circuit means including two rectifying elements connected respectively to two controllable high frequency bidirectional switch elements to form a pair of boost converters, each of the switch elements having a gate for receiving a switch control signal;

(E) low pass filtering alternating voltage components out of the regulated voltage signal, and delivering the DC output voltage signal; and (F) controlling the switch elements to produce a discontinuous current through the inductor at a frequency substantially higher than the frequency of the AC power supply signal to regulate the DC output voltage signal at a desired voltage signal, the step (F) further including steps of:

(I) detecting the DC output voltage signal delivered from step (E), and delivering an output signal indicative of the DC output voltage signal;

(II) comparing the output signal delivered in step (I) to a reference voltage signal to produce a signal representative of a difference between the DC output voltage signal and the desired voltage signal; and (III) producing the switch control signals by means of a pulse width modulator as a function of the signal produced from step (II).

30. A method according to claim 26, wherein:
the inverter resonant circuit means includes controllable high frequency bidirectional switch elements, each of the switch elements having a gate for receiving a switch control signal at a controlled frequency determining the direct current signal supplied to the battery connect terminals; and
the second part includes:
a tertiary winding of the impedance matching transformer, which is magnetically coupled to the second magnetic core part, the tertiary winding being for delivering a voltage signal indicative of a voltage at the battery connect terminals;
the method further includes a step of controlling the switch elements as a function of the voltage signal delivered by the tertiary winding.

31. A method according to claim 26, wherein, in step (b), the power supply means is a voltage regulating means performing the steps of:

(A) receiving by means of an apparatus input an AC power supply signal having a frequency and a peak value;

(B) low pass filtering high-frequency current components out of the AC power supply signal received at the apparatus input;

(C) rectifying an AC signal delivered from step (B) to produce a rectified voltage signal at an output of a rectifying means;

(D) providing an inductor connected in series to the output of the rectifying means;

(E) modulating a current flowing through the inductor to produce a modulated alternating current through the inductor at a frequency higher than the one of the AC power supply signal and to produce a regulated voltage signal having a value equal or greater than the peak value of the AC power supply signal by means of a modulating means including a controllable high frequency switch means connected to a rectifying element to form a boost converter, the controllable high frequency switch means having a gate for receiving a switch control signal;

(F) low pass filtering alternating voltage components out of the regulated voltage signal, and delivering the DC output voltage signal; and (G) controlling the controllable high frequency switch means to produce a discontinuous current through the inductor at a frequency substantially higher than the frequency of the AC power supply signal to regulate the DC output voltage signal at a desired voltage signal, the step (G) further including steps of:

(I) detecting the DC output voltage signal delivered from step (F) and delivering an output signal indicative of the DC output voltage signal;

(II) comparing the output signal delivered in step (I) to a reference voltage signal to produce a signal representative of a difference between the DC output voltage signal and the desired voltage signal; and (III) producing the at least one control signal by means of a pulse width modulator as a function of the signal produced from step (II).

32. A separable two-part battery charger for supplying a direct current signal to battery connect terminals, comprising a first part and a second part, wherein:
the first part includes:
a secondary winding of an impedance matching transformer, having an output for delivering a transformed alternating current signal;
a first magnetic core part of the impedance matching transformer, which is magnetically coupled to the secondary winding;
a current rectifier for rectifying the transformed alternating current signal and delivering a rectified current signal; and
a low pass filter means for low pass filtering the rectified current signal to supply the direct current signal to the battery terminals; and
the second part includes:
a power supply means for producing a DC output voltage signal;
an inverter resonant circuit means for inverting the DC output voltage signal and delivering an alternating current signal, the inverter resonant circuit means including controllable high frequency bidirectional switch elements, each of the switch elements having a gate for receiving a switch control signal at a controlled frequency determining the direct current signal supplied to the battery connect terminals;

a primary winding of the impedance matching transformer, having an input for receiving the alternating current signal;

a second magnetic core part of the impedance matching transformer, which is magnetically coupled to the first primary winding, the second magnetic core part being mechanically connectable to the first magnetic core part;

a tertiary winding of the impedance matching transformer, which is magnetically coupled to the second magnetic core part, the tertiary winding being for delivering a voltage signal indicative of a voltage at the battery connect terminals; and a controller for controlling the switch elements as a function of the voltage signal delivered by the tertiary winding.

33. A charger according to claim 32, wherein:

the current rectifier includes four diodes connected according to a diode bridge configuration having an output; and the low pass filter means comprises a capacitor connected in parallel to the output of the diode bridge configuration, and an inductance connected in series to the battery connect terminals.

34. A charger according to claim 32, wherein:

the power supply means is a voltage regulating means for producing the DC output voltage signal from an AC power supply signal;

the inverter resonant circuit means comprises:
  an inverter means for inverting the DC output voltage signal and delivering a square voltage signal, the inverter means including four controllable high frequency bidirectional switch elements connected in a bridge configuration having two opposite input ends for receiving the DC output voltage signal, and two other opposite output ends for supplying the square voltage signal, each of the four switch elements having a gate for receiving a switch control signal at a controlled frequency determining the direct current signal supplied to the battery connect terminals; and
  a resonant circuit having an input for receiving the square voltage signal and an output for delivering an alternating current signal;

the charger further comprises:
  a voltage detecting means for detecting the DC output voltage signal and delivering a voltage signal indicative of the DC output voltage signal; and
  a current detector for detecting a current signal at the inputs ends of the bridge configuration and delivering a signal indicative of the current signal; and the controller includes:
  a current averaging means for averaging the signal delivered by the current detector and delivering an average current signal indicative of an average value of the current signal;
  multiplying means for multiplying the voltage signal delivered by the voltage detecting means by the average current signal and delivering a battery power signal indicative of a power supplied to the battery connect terminals;
  a regulating means for comparing the battery power signal to a reference power signal and delivering a value representative of a difference between the battery power signal and the reference power signal; and
  an oscillator having an output for delivering the switch control signals at the controlled frequency as function of the value delivered by the regulating means.

35. A charger according to claim 34, wherein the voltage detecting means is a voltage divider having two resistors connected in series.

36. A charger according to claim 34, wherein the resonant circuit comprises a capacitor and an inductor connected in series.

37. A charger according to claim 34, wherein the controller comprises:

a frequency limiter having an input connected to the output of the oscillator, and an output for delivering the switch control signals at a frequency which is limited under a predetermined threshold value; and a driver having an input connected to the output of the limiter, and outputs connected to the gates of the four controllable high frequency bidirectional switch elements.

38. An apparatus according to claim 34, wherein the controller comprises:

a peak voltage detector for detecting a peak voltage of the signal delivered by the tertiary winding and delivering a peak signal representative of the peak voltage of the signal delivered by the tertiary winding;

comparing means for comparing the peak signal delivered by the peak voltage detector to a predetermined threshold signal, and delivering an output signal when the peak signal reaches the threshold signal, the output signal of the comparing means preventing operation of the oscillator.

39. An apparatus according to claim 32, wherein the power supply means is a voltage regulating means comprising:

an apparatus input for receiving the AC power supply signal having a frequency and a peak value;

a first low pass filter having an input connected to the apparatus input for low pass filtering high-frequency current components out of the AC power supply signal received at the apparatus input, the low pass filter having also an output;

an inductor connected to the output of the low pass filter;

a rectifying-modulating bridge circuit means for modulating an alternating current flowing through the inductor at a frequency higher than the one of the AC power supply signal, rectifying this alternating current, and delivering a regulated voltage signal having a value equal or greater than the peak value of the AC power supply signal, the bridge circuit means including two rectifying elements connected respectively to two controllable high frequency bidirectional switch elements to form a pair of boost converters, each of the switch elements having a gate for receiving a switch control signal;

a second low pass filter for low pass filtering alternating voltage components out of the regulated voltage signal, the second low pass filter having an output for delivering the DC output voltage signal; and voltage detecting means for detecting the DC output voltage signal, the voltage detecting means having an output for delivering an output signal indicative of a value of the DC output voltage signal; and a controlling means for controlling the switch elements to regulate the DC output voltage signal at a desired voltage signal by producing a discontinuous current through the inductor at a frequency substantially higher than the frequency of the AC power supply signal, the controlling means including:

a comparing means for comparing the output signal of the voltage detecting means to a reference voltage signal and delivering a signal representative of a difference between the DC output voltage signal and the desired voltage signal; and a pulse width modulator for producing the switch control signals as a function of the signal delivered by the comparing means.

40. An apparatus according to claim 32, wherein the power supply means is a voltage regulating means comprising:

an apparatus input for receiving the AC power supply signal having a frequency and a peak value;

a first low pass filter for low pass filtering high-frequency current components out of the AC power supply signal received at the apparatus input;

rectifying means for rectifying an AC signal delivered from the first low pass filter, the rectifying means having an output for delivering a rectified voltage signal;

an inductor connected in series to the output of the rectifying means;

modulating means for modulating a current flowing through the inductor to produce a modulated alternating current through the inductor at a frequency higher than the one of the AC power supply signal and to produce a regulated voltage signal having a value equal or greater than the peak value of the AC power supply signal, the modulating means including a rectifying element connected to a controllable high frequency switch means to form a boost converter, the controllable high frequency switch means having a gate for receiving a switch control signal;

a second low pass filter for low pass filtering alternating voltage components out of the regulated voltage signal, and delivering the DC output voltage signal; and a voltage detecting means for detecting the DC output voltage signal and delivering an output signal indicative of the DC output voltage signal;

controlling means for controlling the controllable high frequency switch means to regulate the DC output voltage signal at a desired voltage signal by producing a discontinuous current through the inductor at a frequency substantially higher than the frequency of the AC power supply signal, the controlling means including:

a comparing means for comparing the output signal of the voltage detecting means to a reference voltage signal and delivering a signal representative of a difference between the DC output voltage signal and the desired voltage signal; and a pulse width modulator for producing the at least one control signal as a function of the signal delivered by the comparing means.

41. Method of operating a separable two-part battery charger for supplying a direct current signal to battery connect terminals, comprising steps of:

(a) providing a first part which includes:

a secondary winding of an impedance matching transformer, having an output for delivering a transformed alternating current signal;

a first magnetic core part of the impedance matching transformer, which is magnetically coupled to the secondary winding;

a current rectifier for rectifying the transformed alternating current signal and delivering a rectified current signal; and a low pass filter means for low pass filtering the rectified current signal to supply the direct current signal to the battery terminals;

(b) providing a second part which includes:

a power supply means for producing a DC output voltage signal;

an inverter resonant circuit means for inverting the DC output voltage signal and delivering an alternating current signal, the inverter resonant circuit means including controllable high frequency bidirectional switch elements, each of the switch elements having a gate for receiving a switch control signal at a controlled frequency determining the direct current signal supplied to the battery connect terminals;

a primary winding of the impedance matching transformer, having an input for receiving the alternating current signal;

a second magnetic core part of the impedance matching transformer, which is magnetically coupled to the first primary winding, the second magnetic core part being mechanically connectable to the first magnetic core part;

a tertiary winding of the impedance matching transformer, which is magnetically coupled to the second magnetic core part, the tertiary winding being for delivering a voltage signal indicative of a voltage at the battery connect terminals; and (c) controlling the switch elements as a function of the voltage signal delivered by the tertiary winding.

42. A method according to claim 41, wherein step (c) further comprises steps of:

detecting a peak voltage of the signal delivered by the tertiary winding and delivering a peak signal representative of the peak voltage of the signal delivered by the tertiary winding; and comparing the peak signal delivered by the peak voltage detector to a predetermined threshold signal, and delivering an output signal when the peak signal reaches the threshold signal, the output signal delivered in the comparing step preventing operation of the inverter resonant circuit means.

43. A method according to claim 41, wherein in step (b), the power supply means is a voltage regulating means for producing the DC output voltage signal from an AC power supply signal and performs steps of:

(A) receiving by means of an apparatus input the AC power supply signal having a frequency and a peak value;

(B) low pass filtering high-frequency current components out of the AC power supply signal received at the apparatus input by means of a first low pass filter means having an input connected to the apparatus input, and an output;

(C) providing an inductor connected to the output of the low pass filter means;

(D) modulating an alternating current flowing through the inductor at a frequency higher than the one of the AC power supply signal, and rectifying this alternating current to deliver a regulated voltage signal having a value equal or greater than the peak value of the AC power supply signal by means of a rectifying-modulating bridge circuit means, the bridge circuit means.. including two rectifying elements connected respectively to two controllable high frequency bidirectional switch elements to form a pair of boost converters, each of the switch elements having a gate for receiving a switch control signal;

(E) low pass filtering alternating voltage components out of the regulated voltage signal, and delivering the DC output voltage signal; and (F) controlling the switch elements to produce a discontinuous current through the inductor at a frequency substantially higher than the frequency of the AC power supply signal to regulate the DC output voltage signal at a desired voltage signal, the step (F) further including steps of:

(I) detecting the DC output voltage signal delivered from step (E), and delivering an output signal indicative of DC output voltage signal;

(II) comparing the output signal delivered in step (I) to a reference voltage signal to produce a signal representative of a difference between the DC output voltage signal and the desired voltage signal; and (III) producing the switch control signals by means of a pulse width modulator as a function of the signal produced from step (II).

44. A method according to claim 41, wherein, in step (b), the power supply means is a voltage regulating means performing steps of:

(A) receiving by means of an apparatus input an AC power supply signal having a frequency and a peak value;

(B) low pass filtering high-frequency current components out of the AC power supply signal received at the apparatus input;

(C) rectifying an AC signal delivered from step (B) to produce a rectified voltage signal at an output of a rectifying means;

(D) providing an inductor connected in series to the output of the rectifying means;

(E) modulating a current flowing through the inductor to produce a modulated alternating current through the inductor at a frequency higher than the one of the AC power supply signal and to produce a regulated voltage signal having a value equal or greater than the peak value of the AC power supply signal by means of a modulating means including a controllable high frequency switch means connected to a rectifying element to form a boost converter, the controllable high frequency switch means having a gate for receiving a switch control signal;

(F) low pass filtering alternating voltage components out of the regulated voltage signal, and delivering the DC output voltage signal; and (G) controlling the controllable high frequency switch means to produce a discontinuous current through the inductor at a frequency substantially higher than the frequency of the AC power supply signal to regulate the DC output voltage signal at a desired voltage signal, the step (G) further including steps of:

(I) detecting the DC output voltage signal delivered from step (F) and delivering an output signal indicative of the DC output voltage signal;

(II) comparing the output signal delivered in step (I) to a reference voltage signal to produce a signal representative of a difference between the DC output voltage signal and the desired voltage signal; and (III) producing the at least one control signal by means of a pulse width modulator as a function of the signal produced from step (II).

\* \* \* \* \*